United States Patent [19]

Mutoh et al.

[11] Patent Number: 5,571,970

[45] Date of Patent: Nov. 5, 1996

[54] PRESSURE SENSOR

[75] Inventors: Eiji Mutoh; Akihiro Niiya, both of Wako; Shigemitsu Ogawa, Tokyo; Fujito Tanaka, Tokyo; Munenori Tsuchiya, Tokyo; Daiji Uehara, Tokyo; Kenji Nagasawa, Tokyo, all of Japan

[73] Assignees: Honda Motor Co., Ltd.; Nagano Keiki Seisakusho, Ltd., both of Tokyo, Japan

[21] Appl. No.: 218,973

[22] Filed: Mar. 28, 1994

[30] Foreign Application Priority Data

| Mar. 30, 1993 | [JP] | Japan | 5-015489 U |
| Mar. 30, 1993 | [JP] | Japan | 5-015491 U |
| Mar. 30, 1993 | [JP] | Japan | 5-015492 U |

[51] Int. Cl.$^6$ ............................................. G01L 9/12
[52] U.S. Cl. ........................................ 73/724; 73/723
[58] Field of Search ............................ 73/715, 718, 723, 73/724

[56] References Cited

U.S. PATENT DOCUMENTS

| 4,295,376 | 10/1981 | Bell | 73/724 |
| 4,345,299 | 8/1982 | Ho | 73/724 |
| 4,617,607 | 10/1986 | Park et al. | 73/724 |
| 5,165,281 | 11/1992 | Bell | 73/718 |
| 5,189,916 | 3/1993 | Mizumoto et al. | 73/718 |
| 5,233,875 | 8/1993 | Obermeier et al. | 73/718 |

FOREIGN PATENT DOCUMENTS

| 59-148842 | 11/1984 | Japan . |
| 60-34687 | 2/1985 | Japan . |
| 60-56233 | 3/1985 | Japan . |

*Primary Examiner*—Richard Chilcot
*Assistant Examiner*—Elizabeth L. Dougherty
*Attorney, Agent, or Firm*—Flynn, Thiel, Boutell & Tanis, P.C.

[57] ABSTRACT

A pressure sensor based on electrostatic capacity method is disclosed, which comprises the main body of a pressure sensing element having one end surface as a pressured face and the other end surface as a back, for detecting the pressure of a measurement fluid acting on the pressured face, a seal member, a measure pattern on the back, and a one-chip IC. For size reduction, an input-output policy is provided near the main body of the pressure sensing element, and it effects input and output with respect to the pressure sensing element main body while preventing external disturbances and improving the accuracy of measurement.

14 Claims, 16 Drawing Sheets

FIG. I

PRESSURE SENSOR

BACKGROUND OF THE INVENTION

1. Field of the Invention

This invention relates to pressure sensors for detecting the pressures on measurement fluids and is capable of utilization for a pressure sensor based on an electrostatic capacity method, which detects pressure by utilizing changes in capacitance between opposite electrodes.

2. Description of the Related Art

As the prior art pressure sensor for detecting pressure of a measurement fluid, i.e., either liquid or gas, there are those which are based on an electrostatic capacity method or a strain method. These pressure sensors are provided with various internal seals for sealing individual pressure sections with the measurement fluid introduced thereto from external atmosphere sections or sealing the individual pressure sections from one another in order to obtain accurate measurement of the measurement fluid pressure or protecting individual internal circuits or the like from intrusion of the measurement fluid.

FIG. 17 shows a first prior art example of pressure sensor 480 (see Japanese Patent Laid-Open Publication No. H3-72230).

The pressure sensor 480 is based on the electrostatic capacity method. It comprises a pressure sensing element 481, which detects the pressure of a measurement fluid as gauge pressure or pressure difference, and a casing 482 enclosing the element 481.

The pressure sensing element 481 includes a base 483, a diaphragm 484 spaced apart at a regular interval by a spacer and extending parallel to the base 483, and opposite electrodes 485A and 485B provided on the opposite surfaces of the base 483 and diaphragm 484.

The space between the base 483 and diaphragm 484 constitutes a reference pressure chamber 487, which is filled with a fluid (usually atmosphere) under a reference pressure P2 which is led through a pathage 486 penetrating the base 483 and led to the outside of the casing 482.

A pressure chamber 488 is formed on the side of the diaphragm 484 opposite the reference pressure chamber 487, and it is filled with measurement fluid under pressure P1 which is led through a pathage 489 penetrating the casing 482.

A circuit or the like including electrode terminals (not shown), is provided on the side of the back 490 of the base 483. A pressure detection signal is supplied from such circuit through a cable 491 to the outside.

Around the periphery of the pressure chamber 488, an O-ring 492 is provided as a seal member between the diaphragm 484 and the casing 482 to have the pressure chamber 488 gas-tight and water-tight and prevent pressure escapement, while also preventing intrusion of the measurement fluid into the circuit or the like provided on the side of the back 490 of the base 483.

In this pressure sensor 480 based on the electrostatic capacity method, the measurement fluid that is introduced through the pathage 489 into the pressure chamber 488 pushes with its pressure the diaphragm 484, thus causing the diaphragm 484 to be curved to change the space between the base 483 and the diaphragm 484.

At this time, the inter-electrode distance between the opposite electrodes 484A and 485B is also changed to change the capacitance. The pressure of the measurement fluid thus can be detected by determining the change in the capacitance.

FIG. 18 shows a second prior art example of pressure sensor 500 (see Japanese Patent Laid-Open Publication No. S58-731).

This pressure sensor 500, like the first prior art example noted above, is based on the electrostatic capacity method, and it has a pressure sensing element 501 for detecting the pressure of a measurement fluid as absolute pressure.

The pressure sensing element 501, like the above first prior art example, has a base 503, a diaphragm 504 spaced apart at a regular interval by a spacer from and extending parallel to the base 503, and opposite electrodes 505A and 505B provided on the opposite surfaces of the base 503 and diaphragm 504.

The pressure sensing element 501 is covered by an aluminum case 508 via O-rings 506 and 507 as seal members, and the aluminum case 508 is covered by a casing 502. The pressure sensing element 501 and O-rings 506 and 507 are secured in position by mechanically caulking an end 511 o the aluminum case 508.

In the casing 502 and on the side of the back (i.e., on the upper side in FIG. 18) of the pressure sensing element 501, a circuit unit 509 is provided, which converts the electrostatic capacity between the opposite electrodes 505A and 505B into an electric signal. The circuit unit 509 is connected to the opposite electrodes 505A and 505B via leads 510.

The space 512 between the base 503 and the diaphragm 504, unlike the above first prior art example, is usually in vacuum.

On the side of the diaphragm 504 opposite the space 512, a pressure chamber 513 is defined by the diaphragm 504, aluminum case 508 and O-ring 506. To this pressure chamber 513 is led a measurement fluid under pressure measurement through a pathage 514 which is integral with the bottom of the aluminum case 508.

In this pressure sensor 500 based on the electrostatic capacity method, the measurement fluid that has been introduced through the pathage 514 into the pressure chamber 513 pushes the diaphragm 504 as pressure-receiving member with it pressure, thus causing the diaphragm 514 to be curved to change the space between the base 503 and the diaphragm 504.

At this time, the inter-electrode distance between the opposite electrodes 505A and 505B is also changed to change the capacitance. The pressure on the measurement fluid thus can be detected as absolute pressure by determining the change in the electrostatic capacity.

However, the seal provided by the O-ring 492 in the first prior art example of FIG. 17, is liable to become imperfect due to a positional deviation that might be produced when assembling the O-ring 492 in the casing 482 or to degradation of the O-ring 492.

In such a case, the pressure on the measurement fluid can no longer be detected accurately because of leakage of pressure in the pressure chamber 488. Besides, it is prone that the measurement fluid introduces into the circuit or the like on the side of the back 490 of the base 483, thus causing measurement errors. Further, an increase in the pressure in the Pressure chamber 488 may cause flexing of the diaphragm 484 toward the base 483 such as to cause degradation of the seal by the O-ring 492. Therefore, this example is not structurally excellent.

Further, the pressure sensing element 481 has its periphery in contact with and secured in position by the hard casing 482. When an external force is exerted to the casing 481, therefore, it will cause straining of the pressure sensing element 481 to cause an error in the measurement.

Further, in such case as when measuring the pressure difference, the pressure in the reference pressure chamber 487 and the pathage 486 has to be isolated from the external pressure. In such case, it is necessary to provide separate seal members from the O-ring 492 have to be provided in portion A or the like. This means that the number of components is increased, thus requiring increased man-hours for the assembling and leading to a cost increase. Further, this is undesired in view of the management of components.

With the seal by the O-rings 506 and 507 in the second prior art example shown in FIG. 18, unlike the first prior art example shown in FIG. 17, the pressure sensing element 501 is secured to the casing 502 via the O-rings 506 and 507 and aluminum case 508. Thus, when an external force is exerted to the casing 502, its effects are absorbed by the O-rings 506 and 507. That is, there is no problem of error generation in the measurement due to the straining of the pressure sensing element 501. Further, since the O-rings are provided on the opposite sides of the pressure sensing element 501, an excellent seal can be ensured.

However, since the pressure sensor 500 in the second prior art example includes the aluminum case 508, it is structurally complicated and has a large number of components, thus dictating increased man-hours for the assembling.

Further, the provision of the aluminum case 508 leads to a corresponding size increase of the pressure sensor 500.

Further, while the O-rings 506 and 507 and pressure sensing element 501 are secured to one another by mechanically caulking the end 511 of the aluminum case 508, in this case the O-rings 506 and 507 and pressure sensing element 501 are liable to be deviated in position relative to one another, thus resulting in an imperfect seal.

FIG. 19 shows a third prior art example of pressure sensor 900 based on the capacitance measurement (see Japanese Patent Laid-Open Publication No. H2-189435).

This pressure sensor 900 has a cylindrical casing 901 with a bottom. A pressure sensing element 903 is mounted in the casing 901 via an O-ring 902. The pressure sensing element 903 includes a base 904 having a large thickness and a diaphragm 905 having a small thickness and capable of deformation by the pressure of measurement fluid. The base 904 and the diaphragm 905 are spaced apart at a regular interval via a joining area 906 such that they extend parallel to each other. The opposite surfaces of the base 904 and the diaphragm 905 are provided with respective opposite electrodes 907 and 908, which form a capacitor 909. The pressure of the measurement fluid can be detected from a change in the capacitance of the capacitor 909.

A space 910 is defined between the base 904 and the diaphragm 905. The space 910 is held in vacuum. Another space 911 is formed on the side of the diaphragm 905 opposite the space 910. The measurement fluid is introduced into the space 911 from a port 912.

On the side of the back of the base 904, a space 914 is formed by an electric, connector 913 which is disposed such as to close the opening of the casing 901. This space 914 is tight sealed by sealing members 915 and 916 of rubber or like material.

In the space 914 a flexed base 917 is provided, and a measure circuit 918 is provided on the inner surface of the base 917. The measure circuit 918 is connected to opposite electrodes 907 and 908 to measure a change in the electrostatic capacity of the capacitor 109. The measure circuit 918 is connected to connector terminals 919 for such purposes as power supply, grounding, taking out output signal, etc.

FIG. 20 shows the measure circuit 918. In the Figure, the base 917 is shown in a developed state. The measure circuit 918 has an integrated circuit unit 920, a resistor 921, capacitors 922 and circuit patches which connect these circuit elements to one another.

In such third prior art example of the pressure sensor 900, the space 910 is held in vacuum, and a measurement fluid is introduced through the port 912 into the space 911 so that it acts on a pressured face 920 to cause flexing of the diaphragm 905. With the flexing of the diaphragm 905 the space between the electrodes 907 and 908, is changed. Thus, the pressure on the measurement fluid is detected as absolute pressure by making use of the change in the capacitance of the capacitor 909. Further, with this pressure sensor based on the electrostatic capacity method, the space (910 may be held under atmospheric pressure for gauge pressure measurement.

With the above third prior art example of the pressure sensor 900, however, in case when the insulation resistance of the surface of the base 917 changes due to a change in the relative humidity in the space 914, a leakage current is generated between connected portions of the opposite electrodes 907 and 908 in the measure circuit 918. In such a case, accurate pressure measurement can no longer be obtained. To avoid adverse effects of the ambient changes in the external atmosphere on the measure circuit 918, various measures have been provided.

More specifically, the space 914 is tight sealed and isolated from the external atmosphere to prevent adverse effects of the ambient changes in the external atmosphere. This means that the provision of the sealing members 915 and 916 for the tight sealing increases the number of components and complicates the structure. Besides, the process of manufacture is complicated, and the cost is increased. Further, a space for the tight sealing is necessary, thus increasing the size of the pressure sensor.

Further, such tight seal structure is liable to become imperfect due to degradation of the sealing members 915 and 916 and positional deviations during manufacture. To prevent this, a considerably complicated operation is required for obtaining the seal. In addition, it is necessasry to provide a sufficient amount of seal material.

Further, it is necessary to provide a capacitor, which can provide for a large capacity change due to the pressure from the measurement fluid in order that any leakage current generated due to a relative humidity change as noted above will have negligible effects. This, however, is undesired for the purpose of the size reduction of the pressure sensor.

Further, since the base 917 for mounting various components of the measure circuit 918 is provided in the space 914, it is necessary to secure a space for disposing the base 917, thus increasing the size of the pressure sensor.

Further, since the measure circuit 918 comprises a large number of components such as the integrated circuit unit 920, resistor 921, capacitors 922, etc., manufacturing process complication and manufacturing cost increase are dictated by the steps of disposing the large number of components in addition to the the step of installing the base 917.

Further, since the measure circuit 918 comprises a large number of components, contact failure is liable during manufacture, thus causing reduction of the product yield.

FIG. 21 shows a fourth prior art example of pressure sensor 800 (see Japanese Utility Model Laid-Open Publication No. H57-105943).

This pressure sensor 800, like the above third prior art example of the pressure sensor 900, comprises a base 801 having a large thickness and a diaphragm 802 having a small thickness and capable of being deformed with the measurement fluid pressure. The base 801 and the diaphragm 802 are spaced apart at a regular interval via a joining area 803 such that they extend parallel to each other. The opposite surfaces of the base 801 and the diaphragm 802 are provided with opposite electrodes 804 and 805, which form a capacitor 806. The pressure on the measurement fluid can be detected from a change in the electrostatic capacitance of the capacitor 806.

With the above fourth prior art example of the pressure sensor 800, unlike the third prior art example, there is no need of securing the space for installing the base 917. However, the measure circuit 807 includes many components such as the chip 810 and thin film resistor 811. Therefore, like the third prior art example the manufacturing process is complicated, and the manufacturing cost is increased. Further, because of the large number of components involved, it is difficult to reduce the size of the pressure sensor.

An object of the invention is to provide a pressure sensor, which permits accurate measurement of pressure while being ready to manufacture, permitting size reduction and being excellently durable.

SUMMARY OF THE INVENTION

To attain the above object of the invention, input-output policy is provided in the neighborhood of a ceramic main body of the pressure sensing element of electrostatic capacity type to permit input and output with respect to the main body of the pressure sensing element while preventing external disturbance influence. The main body of the pressure sensing element of electrostatic pressure type is a pressure conversion element body, which has a structure comprising a ceramic base having one end surface as a back, a ceramic elastic diaphragm facing and spaced apart at a regular interval from the side of the base opposite the back thereof and having a pressured face for acting a measurement fluid thereon, and electrodes formed on the opposite surfaces of the base and diaphragm.

According to the invention, with the provision of the input-output policy in the neighborhood of the main body of the pressure sensing element, it is possible to reduce the size of the pressure sensing element. In addition, since input and output with respect to the main body of the pressure sensing element are done while preventing external disturbance influence, it is possible to improve the accuracy of the measurement.

Specifically, the invention features a pressure chamber, in which an input part of the above input-output policy, i.e., a part for introducing a measurement fluid to the main body of the pressure sensing element such that the measurement fluid acts on the pressured face of the main body of the pressure sensing element, is disposed in contact with the pressured face, and a seal member for sealing the pressure chamber gas tight and water tight with respect to the external pressure, the seal member being a one-piece molding such as to cover the entire periphery, edge of the pressured face and edge of the back of the main body of the pressure sensing element, the seal member being held in close contact with the edge of the pressured face and the edge of the back of the main body of the pressure sensing element.

According to the invention with the provision of the seal member having the above featuring shape, the pressure of a measurement fluid is detected by introducing the measurement fluid into the pressure chamber sealed by the seal member gas tight and water tight with respect to the external pressure such that the measurement fluid acts on the pressured face of the main body of the pressure sensing element.

Since the seal member is a one-piece molding such as to cover the entire periphery, the edge of the pressured face and the edge of the back of the pressure sensing element, it can be assembled in the casing of the pressure sensor without possibility of positional deviation. It is thus possible to reduce the degradation of the seal with degradation of the seal member.

Thus, it is possible to permit accurate detection of the measurement fluid pressure and reliable prevention of the intrusion of the measurement fluid into the circuit or the like in the pressure sensor.

Further, since the seal member is provided such that it extends up to the edge of the back of the main body of the pressure sensing element, even if the seal of the edge of the pressured face is deteriorated with flexing of the diaphragm toward the base caused by a pressure increase in the pressure change, reliable seal can be obtained as a whole because seal is effected on the back.

Further, since the seal member is provided such as to cover the main body of the pressure sensing element, an external force that may be exerted to the casing has no direct influence on the pressure sensing element, and the pressure sensing element is protected by the elasticity of the seal member.

Thus, there is no possibility of generation of a measurement error due to straining of the main body of the pressure sensing element, and it is also possible to prevent life reduction of the product due to vibrations of the circuit or the like provided on the back of the main body of the pressure sensing element. It is thus possible to attain the above object.

According to the invention, an output unit of the input-output policy noted above, i.e., a part which obtains an electric output signal representing the pressure of the measurement fluid from the main body of the pressure sensing element, comprises a measure pattern formed on the back of the pressure sensing element and a one-chip IC mounted directly on the measure pattern.

More specifically, the invention features that the input-output policy comprises a measure pattern formed on the back noted above and having an electrode terminal for the base side electrode and an electrode terminal for the elasticity diaphragm side electrode, and a one-chip IC mounted directly on the measure pattern and including a measure circuit for converting a change in the electrostatic capacity between the electrodes that is produced with a displacement of the elasticity diaphragm into an electric output signal representing the pressure of the measurement fluid.

According to the invention with the provision of the above one-chip IC, with the straining of the elasticity diaphragm caused as the pressure of the measurement fluid is applied to the elasticity diaphragm, the inter-electrode distance between the base side and the elasticity diaphragm side is changed to change the inter-electrode electrostatic capacity. This electrostatic capacity change is transmitted to the measure pattern that is formed on the back of the main body of the pressure sensing element and converted by the measure circuit provided in the one-chip IC mounted directly on the measure pattern into an electric output signal.

Since the one-chip IC containing the measure circuit is mounted directly on the measure pattern formed on the back of the main body of the pressure sensing-element, unlike the third prior art example noted above, there is no need of providing a base or the like as a separate member for mounting the measure circuit thereon. That is, no space is needed for installing the base or the like, thus permitting the size reduction of the pressure sensor.

Further, the measure circuit comprises the sole one-chip IC and, unlike the third and fourth prior art examples, does not use a large number of components. The pressure sensor thus can be readily manufactured at low cost, and its components can be readily managed. It is thus possible to attain the above object.

Further, according to the invention the output unit of the input-output policy, i.e., a part for obtaining an electric output signal representing the pressure of the measurement fluid from the main body of the pressure sensing element, comprises a measure pattern of a specific structure and disposition that is formed on the back of the main body of the pressure sensing element.

More specifically, the base side electrode comprises a plurality of division electrode progressively enclosing inner ones, at least one of these electrodes including the outermost one being grounded and serving as a shield electrode held at a constant voltage, the remaining electrodes all serving as measure electrodes used for the measurement. Further, the input-output policy comprises a measure pattern formed on the back and including an electrode terminal for the shield electrode, an electrode terminal for the measure electrode, an electrode terminal for the elasticity diaphragm side electrode, and a circuit path provided between an electrode terminal for the elasticity diaphragm side electrode and an electrode terminal for the measure electrode and connected to the electrode terminal for the shield electrode.

According to the invention with the provision of the measure pattern having the above specific structure and disposition, the circuit path that is connected to the electrode terminal for the shield electrode held at a constant voltage is provided between the electrode terminal for the measure electrode and the electrode terminal for the elasticity diaphragm side electrode. Thus, the leakage current noted above, generated between the base side measure electrode and the elasticity diaphragm side electrode with reduction of the insulation resistance of the surface of the back noted above caused by a relative humidity change, can be absorbed by the circuit path connected to the electrode terminal for the shield electrode. It is thus possible to accurately detect the pressure on the measurement fluid without being influenced by ambient changes such as the relative humidity change and also by nearly charged objects such as a power source.

Thus, there is no need of tight sealing the electrode pattern and the measure circuit mounted thereon. It is thus possible to reduce the number of components for the tight sealing, dispense with the manufacturing step for the tight sealing and thus permit cost reduction. Further, there is no need of securing a space for the tight sealing, thus permitting size reduction of the pressure sensor.

Further, even a weak current permits stable pressure detection without being influenced by external disturbances, and it is thus possible to permit size reduction of the pressure sensor by using electrodes subject to less capacity changes.

Further, as the arrangement of the above measure pattern, the circuit path connected to the electrode terminal for the shield electrode is adapted to absorb the leakage current to prevent effects thereof, and thus it can be mounted such that it is flush with the electrode terminal for the base side measure electrode and the electrode terminal for the elasticity diaphragm side electrode, and the measure circuit (i.e., one-chip IC), and the like can be mounted directly on the back of the main body of the pressure sensing element.

It is thus possible to dispense with the base or the like as a separate member for mounting the measure circuit thereon, thus reducing the number of components, dispensing with the step of mounting the base or the like and realizing a reduced size pressure sensor with space saving. It is thus possible to attain the above object.

DETAILED DESCRIPTION OF THE PREFERRED EMBODIMENT(S)

Now, embodiments of the invention will be described with reference to the drawings.

Figure 1:
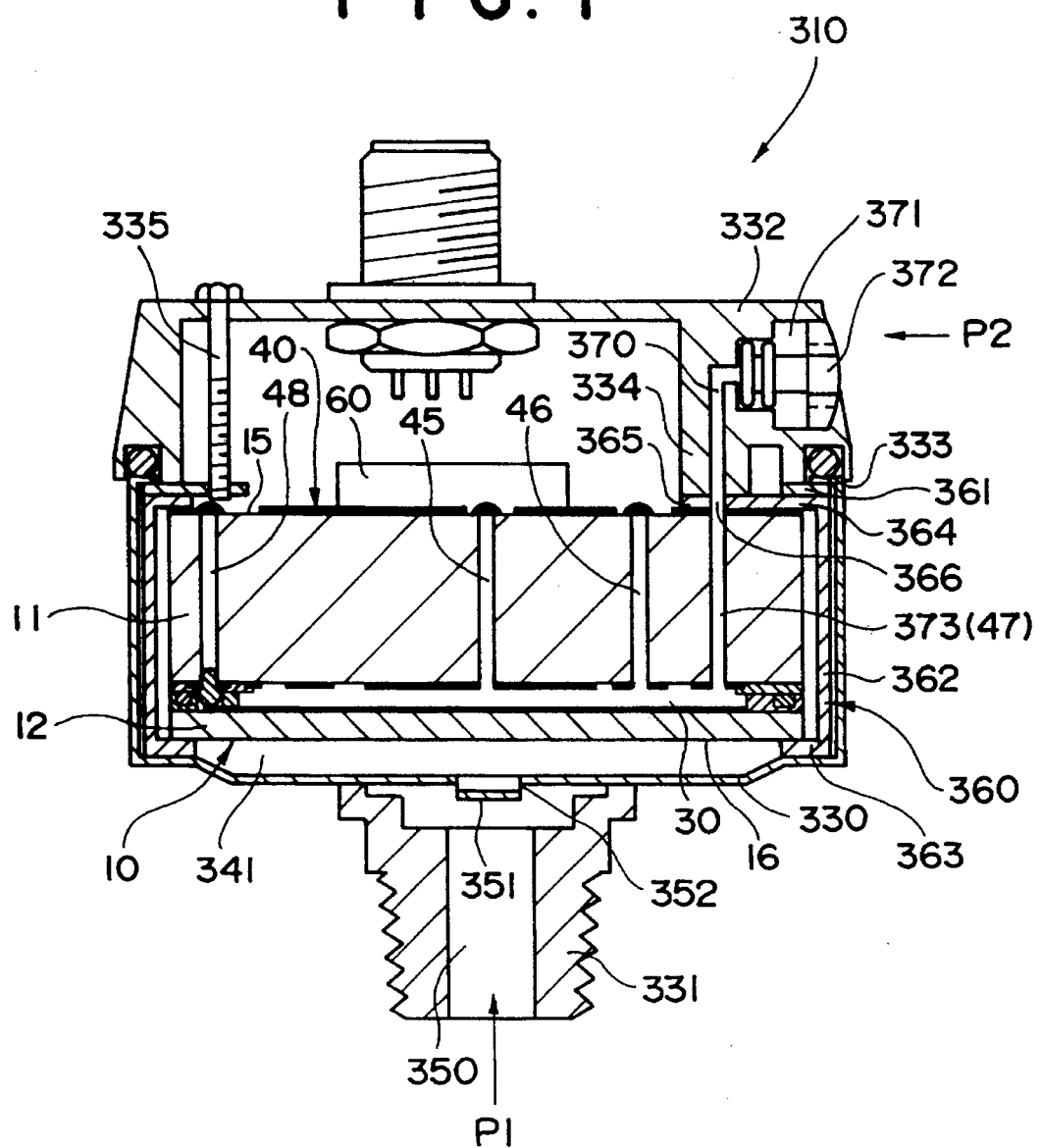
FIG. 1 is a sectional view showing a first embodiment of the pressure sensor according to the invention.

FIGS. 1 to 9 illustrate a first embodiment of the pressure sensor based on electrostatic capacity method according to the invention. FIG. 1 shows the overall structure of the pressure sensor 310. FIGS. 2 to 9 show in detail a pressure sensing element 10, which is mounted in pressure sensor 310 for converting the pressure on a measurement fluid into an electric output signal representing the pressure on the measurement fluid.

Referring to FIG. 1, the pressure sensor 310 comprises a disk-like pressure sensing element 10 disposed centrally for detecting the pressure on the measurement fluid, a metal case 330 as a casing covering the element, a joint 331 welded to the the metal case 330 and a cover 332 fitted on the metal case 330.

Figure 2:
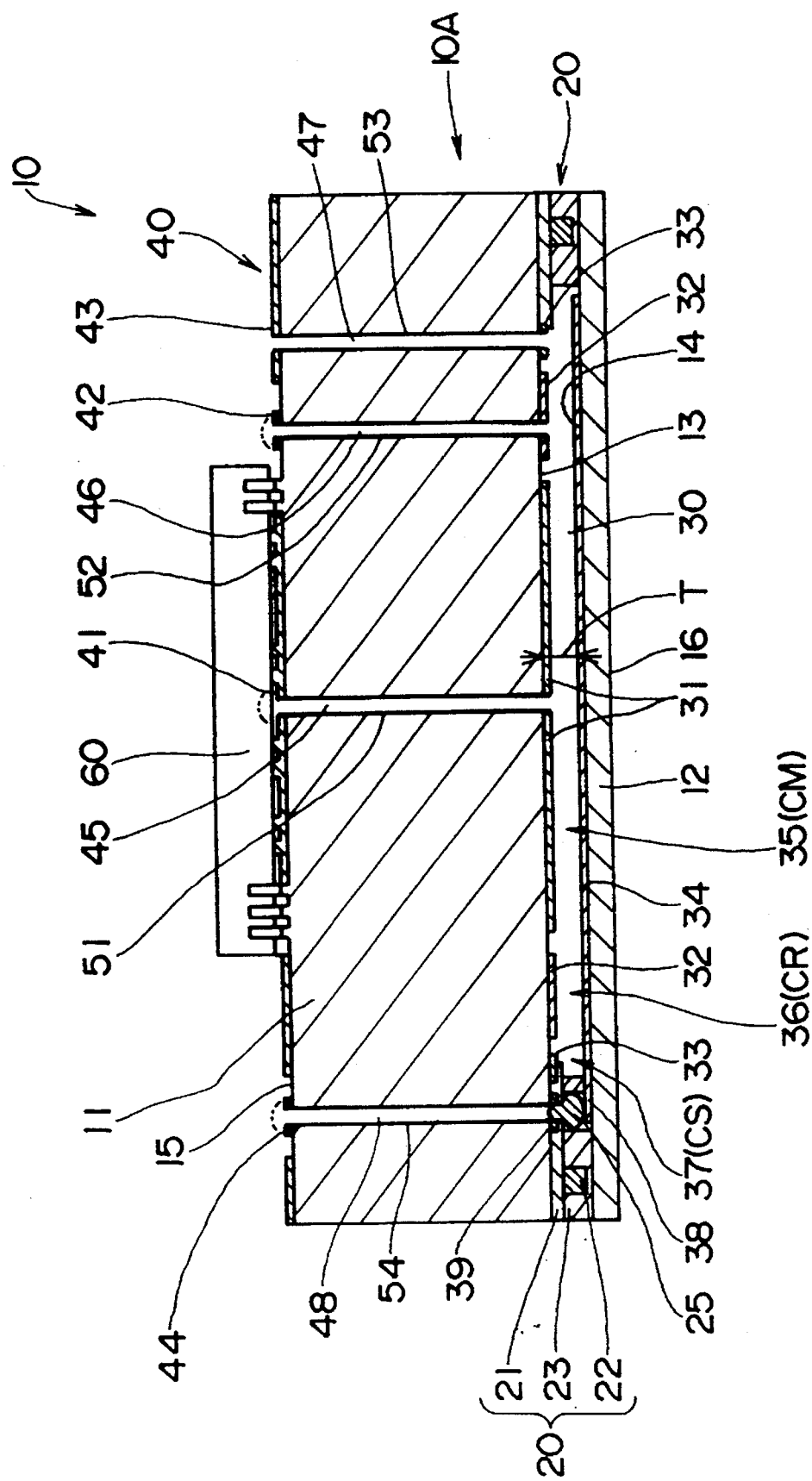
FIG. 2 is a sectional view showing a pressure sensing element in the first embodiment.

Referring to FIGS. 1 and 2, the pressure sensing element 10 has a flat disk-like main body 10A. The main body 10A includes a ceramic base 11 having a large thickness and a ceramic diaphragm 12 having a small thickness and capable of being deformed by the pressure on the measurement fluid. The base 11 and diaphragm 12 are spaced apart at a regular interval by a spacer or joining area 20 and extend parallel to each other. Between the opposite surfaces 13 and 14 of the base 11 and diaphragm 12, respectively, a space 30 is defined such that it is surrounded by the joining member 20 which is ring-like. The space 30 constitutes a reference pressure chamber, into which a gas (i.e., atmosphere) reference pressure P2 for measurement is introduced.

A space between the diaphragm 12 and the metal case 330 constitutes a pressure chamber 341, into which a measurement fluid under pressure P1 is introduced. The diaphragm 12 intervenes between the pressure chamber 341 and the space 30 as the reference pressure chamber.

Figure 3:
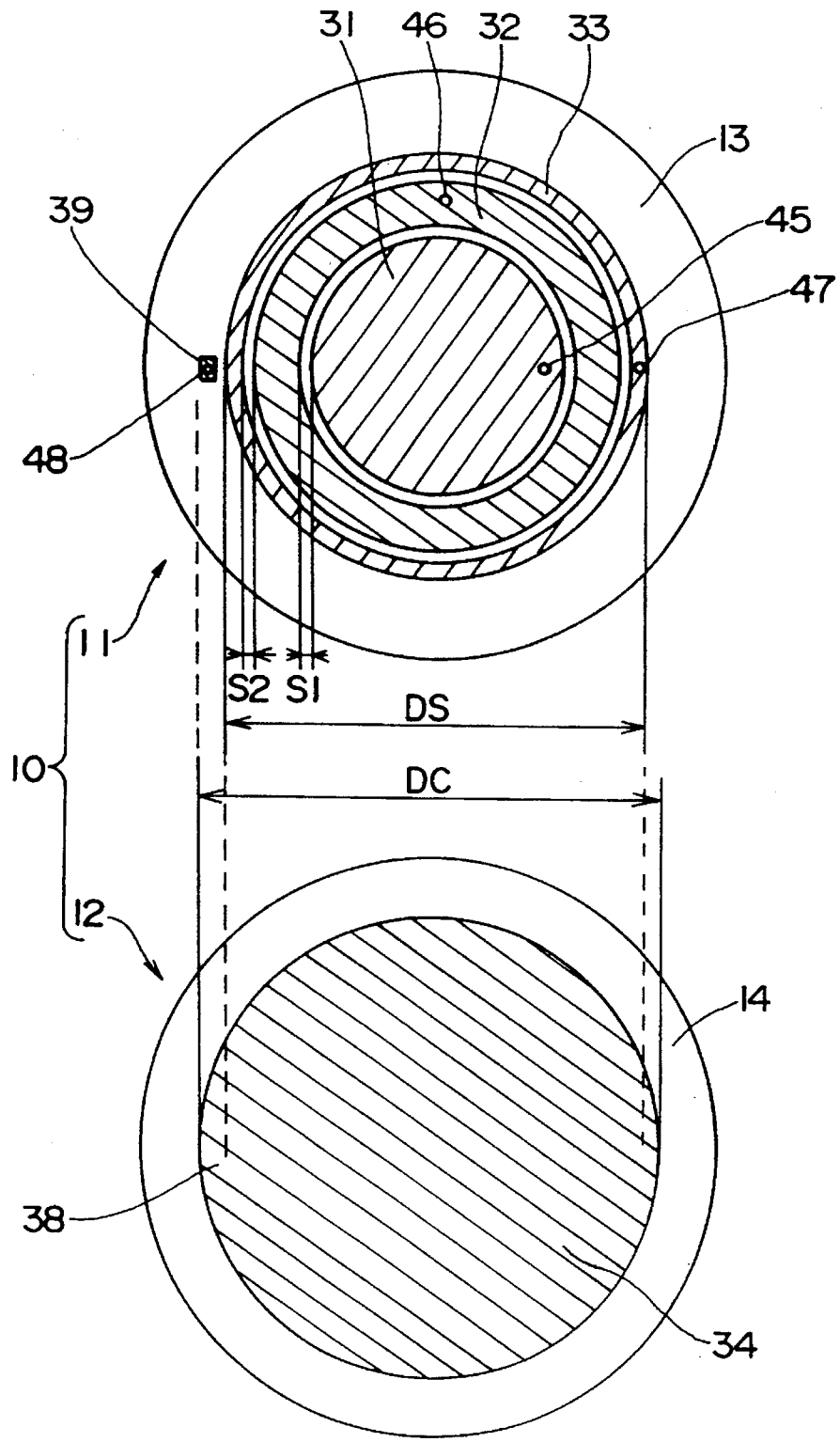
FIG. 3 is a disassembled view showing the pressure sensing element in the first embodiment.

As shown in FIG. 3, on the surface 13 of the base 11 are provided three electrodes, i.e., a solid circular mid-gear electrode 31 and two other ring-like electrodes, i.e., a reference electrode 32 and a shield electrode 33. On the surface 14 of the diaphragm 12 a solid circular common electrode 34 is provided on the surface 14 of the diaphragm 12. The mid-gear and reference electrodes 31 and 32 are measuring electrodes used for the measurement, while the shield electrode 33 is grounded or held at a constant voltage and has nothing to do with the measurement value.

FIG. 3 shows the base 11 and diaphragm 12 as viewed from the sides of the opposite surfaces 13 and 14. The shaded portions in the Figure do not show any section, but are shown for facilitating the description. Shaded portions in FIGS. 4 and 12 to be described later are also for the same purpose.

On the surface 13 of the base 11, the mid-gear electrode 31 is formed in the form of a solid circle, the reference electrode 32 is formed in the form of a closed ring such as to enclose the mid-gear electrode 31, and the outermost shield electrode 33 is formed such as to surround the reference electrode 32. The space S1 between the mid-gear and reference electrodes 31 and 32 and the space S2 between the reference and shield electrodes 32 and 33 are each about 500 μm.

On the surface 14 of the diaphragm 12, the common electrode 34 is formed as a solid circle. Its major diameter DC is greater than the major diameter DS of the shield electrode 33. A portion of the common electrode 34 on the outer side of the edge of the shield electrode 33 is an outer edge portion 38 for the formation of an electrode terminal to be described later.

Outside of the shield electrode 33 on the surface 13 of the base 11, a joint electric terminal 39 which is electrically joined to the outer edge portion 38 of the common electrode 34 is formed by using an electrically conductive material such as palladium paste.

Referring back to FIG. 2, the individual electrodes are forming three capacitors with the atmosphere in the space 30 as the dielectric. More specifically, a capacitor 35 with electrostatic capacity CM is formed by the mid-gear and common electrodes 31 and 34, a capacitor 36 with electrostatic capacity CR is formed by the reference and common electrodes 32 and 34, and a capacitor 37 with electrostatic capacity CS is formed by the shield and common electrodes 33 and 34. The inter-electrode distance T of the capacitors 35 to 37 is determined by the thickness of the joining area 20 and is about 50 μm, for instance, in a state without pressure acting on the diaphragm 12.

The surface of the diaphragm 12 on the side thereof opposite the surface 14 is a pressured face 16, to which the pressure P1 of the measurement fluid is applied. The pressure sensing element 10 is adapted to detect the pressure P1 of the measurement fluid by utilizing the fact that the electrostatic capacity values CM, CR and CS of the capacitors 35 to 37 are changed with changes in the initial value T of the inter-electrode distance of the capacitors caused by flexing of the diaphragm which is caused by the pressure difference between the pressure on the measurement fluid acting on the pressured face 16 of the diaphragm 12 and the atmospheric pressure P2 in the space 30 serving as the reference pressure chamber.

A one-chip IC 60 is mounted on the surface of the base 11 on the side thereof opposite the surface 13 of the back 15. The one-chip IC 60, as will be described later in detail, is a C-MOS ASIC (custom IC) and internally includes a measure circuit 65 for measuring the changes in the electrostatic capacitances CM, CR and CS. On the back 15 of the base 11, a measure pattern 40 for mounting the one-chip IC 60 directly thereon is formed by printing. The one-chip IC 60 and measure pattern 40 constitute an output unit of an input-output policy for effecting input and output with respect to the main body 10A of the pressure sensing element 10.

Figure 4:
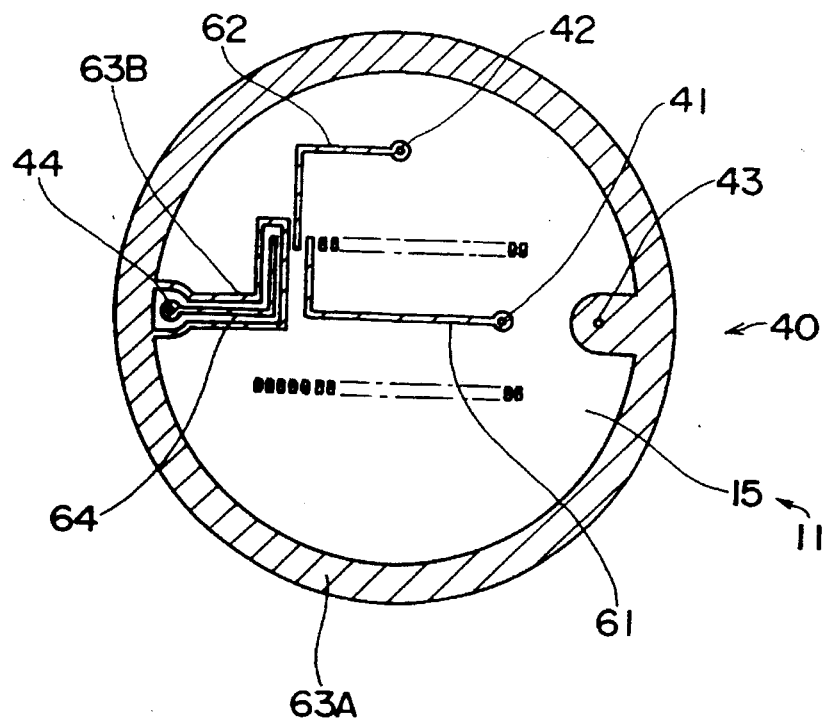
FIG. 4 is a view showing a measure pattern on the back in the first embodiment (before mounting of a one-chip IC)
Figure 5:
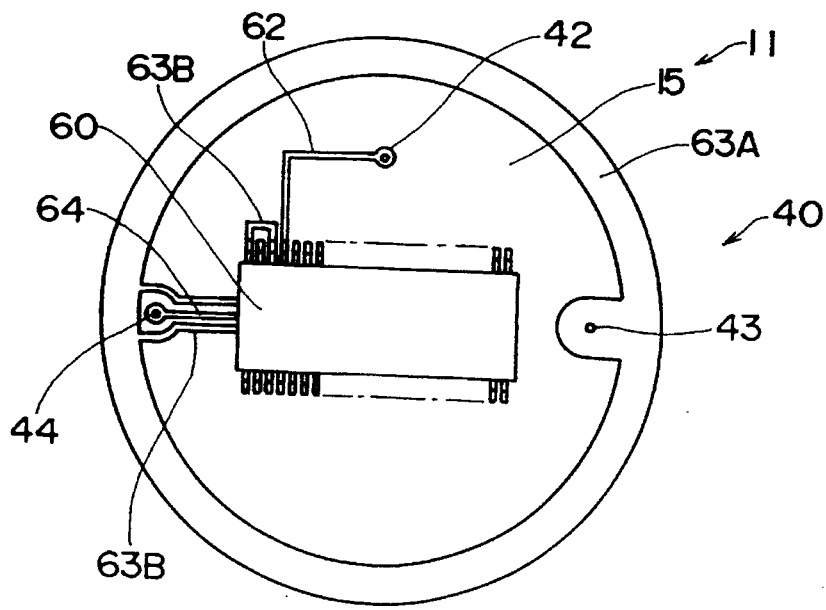
FIG. 5 is a view showing a measure pattern on the back in the first embodiment (after mounting of the one-chip IC)

FIGS. 4 and 5 show detailed structure of the measure pattern 40. FIG. 4 shows the measure pattern before mounting the one-chip IC 60. FIG. 5 shows the measure pattern after mounting the one-chip IC 60.

The measure pattern 40 has a ring-like circuit path 63A formed on an outer edge portion of the back 15 of the base 11. The circuit path 63A has an inner projection as shown on the right side in the Figure. An electrode terminal 43 for the shield electrode 33 on the side of the base 11, is formed in an electrically conductive state in the inner projection.

Inside the circuit path 63A, electrode terminals 41 and 42 for the mid-gear and reference electrodes 31 and 32 on the side of the base 11 and an electrode terminal 44 for the common electrode 34 on the side of the diaphragm 12, are formed in the form of spots. Key-like circuit pathes 61, 62 and 64 are formed such that they extend from the electrode terminals 41, 42 and 44 and are led to pin positions of the one-chip IC 60.

A circuit path 63B is provided around and at regular intervals from the electrode terminal 44 for the common electrode 34 and the circuit path 64. The circuit path 63B is connected to the inner side of a left portion in the Figure of the ring-like circuit path 63A and made integral with the the circuit path 63A. The circuit path 63A is disposed such that it pathes by leg positions of the one-chip IC that are located on the opposite sides of an end of the circuit path 64 and connected to a round terminal of the one-chip IC 60. The circuit pathes 63A and 63B which are in conduction with the electrode terminal 43 for the shield electrode 33 are grounded.

Thus, the circuit path 61 which includes the electrode terminal 41 for the mid-gear electrode 31 and the circuit path 62 which includes the electrode terminal 42 for the reference electrode 32 are isolated by the circuit pathes 63A and 63B from circuit path 64 and the electrode terminal 44 for common electrode 34. It is thus possible to reduce the effects of an increase of the leak-off electric current due to reduction of the insulation resistance between adjacent ones of these circuit pathes.

The individual electrode terminals 41 to 44, as shown in FIG. 2, are in electric conduction with a joining electrode terminal 39 in conduction with the mid-gear, reference, shield and common electrodes 31 to 34 via continuity sections 51 to 54 which are formed in electrode holes 45 to 48 penetrating the base 11.

The continuity sections 51 to 54 are formed on the wall surfaces of the electrode holes 45 to 48 such that a thorough-hole is formed in the center of each hole. The thorough-hole in the electrode hole 48 is closed by electrical conductive paste 25 to be described later. At least one of the thorough-holes in the remaining electric holes 45 to 48 is open at both ends and can lead external atmosphere to the space 30.

Where the pressure sensing element 10 is mounted in the metal case 330 as in this first embodiment such that gas (i.e., atmosphere) under pressure P2 as reference pressure for measurement is led into the space 30 from the outside of the metal case 330, as shown in FIG. 1, the ends Of the electrode holes 45 and 46 may also be closed in addition to the electrode hole 48, and the thorough-hole formed in the electrode hole 47 may be utilized as a low pressure port 373 communicated with a continuity port 370 which will be described later.

The spacer 20 comprises overcoat glass 21 provided in close contact with the side of the base 11 such as to cover the outer periphery of the shield electrode 33, ring-like high-melting glass 22 provided in the space between the overcoat glass 21 and the diaphragm 12 for adjusting the space, and low-melting glass 23 provided between the overcoat glass 21 and diaphragm 12 and on the inner and outer peripheries of the high-melting glass 23.

The overcoat glass 21 is provided to increase the creepage distance of insulation between the shield electrode 33 and common electrode 34 so as to increase the resistance at the creepage distance of insulation.

The high-melting glass 22 is crystallization glass or the like, and its thickness is adjustable to maintain a constant space as the space between the base 11 and diaphragm 12, i.e., the inter-electrode distance T. The pressure range alteration is usually done by changing the thickness of the diaphragm 12, but it can also be done by changing the inter-electrode distance T with thickness adjustment of the high-melting glass 22.

The low-melting glass 23 is non-crystallization glass or the like, and it is provided define a local space 24. In the space 24, electrically conductive paste 25 is provided to have the outer edge portion of the common electrode 34 and the joining electrode terminal 39 in conduction with each other. The space 24 is partitioned from the space 30 by the low-melting glass 23 in order to prevent electrically conductive paste 25 to get out when it is inserted in a manufacturing step to be described later. Thus, the common electrode 34 is in conduction from its outer edge portion with the electrically conductive paste 25, joining electrode terminal 39 and continuity section 54 in the mentioned order and then with the electrode terminal 44 on the back 15 of the base 11. A part of the space 24, to which the electrically conductive paste 25 is inserted, is formed such as to correspond to the overcoat glass 21. Depending on the disposition of the high-melting glass 22, the space 24 may be provided in the high-melting glass 22.

Figure 7:
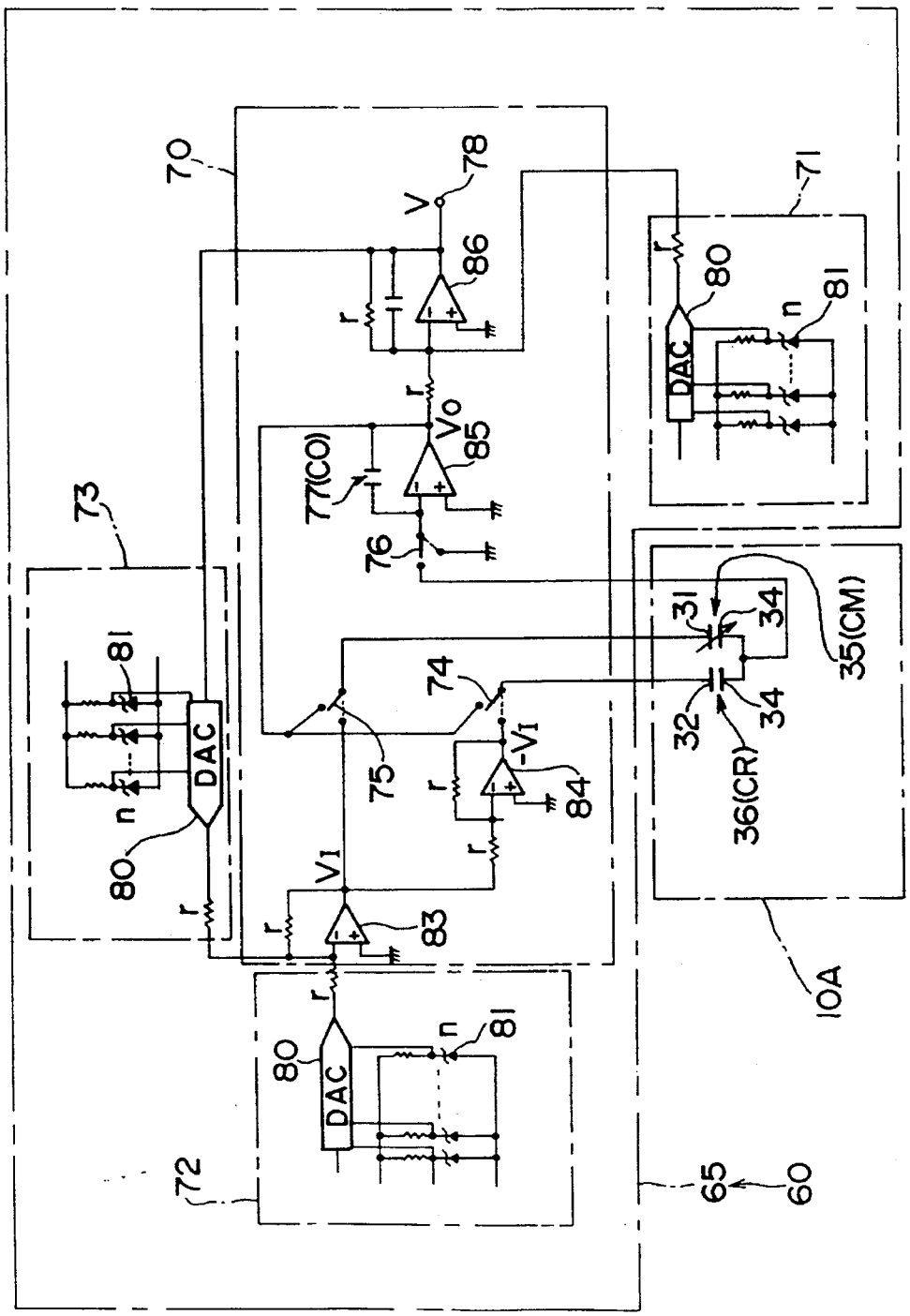
FIG. 7 is a schematic representation of a measure circuit in the first embodiment.

FIG. 7 shows the measure circuit provided in the one-chip IC 60.

Referring to FIG. 7, the measure circuit 65, as will be described later in detail, includes a circuit 70 as circuit provision for obtaining an output signal, which is related to the ratio between the sum of and difference between the electrostatic capacitance values CM and CR of the capacitors 35 and 36 in the main body 10A of the pressure sensing element 10. Further, it includes a zero point adjustment circuit 71 as zero point adjustment provision for adjusting the zero point of the output signal of the measure circuit 65, a span adjustment circuit 72 as span adjustment provision for adjusting the span between the input side pressure range and the output side output signal range in the relation between the pressure on the measurement fluid coupled to the diaphragm 12 in the main body 10A and the corresponding output signal of the measure circuit 65, and a linearity compensation circuit 73 as linearity smoothing provision for compensating for the linearity of the relation between the applied pressure and the corresponding output signal.

The circuit 70 includes an operational amplifier 83. Output signals of the span adjustment circuit 72 and the linearity compensation circuit 73 are input to a minus terminal of the operational amplifier 83.

The output side of the operational amplifier 83 is connected to one terminal of a switch 75 directly and also via an operational amplifier 84. The switches 75 and 74 have their common terminals connected to the mid-gear and reference electrodes 31 and 32, respectively, each of which is one electrode of each of the capacitors 35 and 36.

The common electrode 34, which is the other electrode of each of the capacitors 35 and 36, is connected via the switch 75 to the minus terminal of the operational amplifier 85. The output side of the operational amplifier 85 is commonly connected to the other terminal of each of the switches 75 and 74 and also to the minus terminal of the operational amplifier 86. A capacitor 77 (with electrostatic capacitance Co) is provided for data hold purpose (as will be described later in detail) between the output side and minus terminal of the operational amplifier 85.

The output signal of the zero point adjustment circuit 71 is input to the minus terminal of the operational amplifier 86. The operational amplifier 86 has its output side connected to an output terminal 78, and its output signal is fed back to the linearity compensation circuit 73.

The operational amplifiers 83 to 86 each have their plus terminal grounded.

The zero adjustment, span adjustment and linearity compensation circuits 71 to 73 each have a plurality of (i.e., n in FIG. 7) zener-zap-diodes 81 which are connected in parallel with a digital analog converter (DAC) 80. These zener-zap-diodes may be trimmed in a necessary bit number to adjust the output signal according to each function.

In FIG. 7, the circuit 70 has three switches 74 to 76, which can be switched between the dashed and solid line states in the Figure.

In the dashed line state of the switches 74 to 76, the output voltages VI and −VI of the respective operational amplifiers 83 and 84 are applied to the capacitors 35 and 36 in the main body 10A, and electric charges QM and QR are stored as QM=−CM×VI and QR=CR×VI according to the electrostatic capacitance values CM and CR.

As a specific example of the voltage and electrostatic capacity, the voltage VI is about 2.5 V (2×VI=5 V) and each of the electrostatic capacity values CM and CR is 30 pF. The flexing of the diaphragm 12 usually causes a change in the electrostatic capacity of the capacitor 35 of about 6 to 8 pF and a change in the electrostatic capacity of the capacitor 36 of 1 to 2 pF. The difference between the two electrostatic capacitance values thus becomes about 5 to 6 pF.

In the solid line state of the switches 74 to 76, the difference ΔQ between the electric charge values QM and QR stored in the capacitors 35 and 36 is brought to the capacitor 77. At this time, if QR>QM, the equilibrium stage of the voltage VX across each of the capacitors 35 and 36 is $$VX=(QR-\Delta Q)/CR=(QM+\Delta Q)/CM.$$

Thus, we obtain ΔQ=(CM×QR÷CR×QM)/(CR+CM) With the movement of the electric charge ΔQ, the output voltage VO of the operational amplifier 85 becomes $$\begin{aligned}
VO &= VX = (QR - \Delta Q)/CR \\
&= [CR \times VI - \{(CM \times QR - CR \times QM)/ \\
&\quad (CR + CM)\}]/CR \\
&= [CR \times VI - \{(CM \times CR \times VI + CR \times VI)/ \\
&\quad (CR + CM)\}]/CR \\
&= \{(CR - CM)/(CR + CM)\} \times VI.
\end{aligned}$$

Thus, it is possible to obtain an output signal which is related to the ratio between the sum of and difference between the electrostatic capacity values CM and CR of the capacitors 35 and 36.

Referring back to FIG. 1, the joint 331 is provided by means of projection welding on the outside surface of the metal case on the side of the thereof opposite the pressure chamber 341.

In the joint 331, a measurement fluid introducing path 350 is formed. The measurement fluid as a subject of the pressure measurement is introduced through the measurement fluid introducing path 350.

The metal case 330 has a stamped portion 351 facing the measurement fluid introducing path 350. The stamped portion 351 has a slit-like gap as a measurement fluid inlet 352 with respect to the metal case 330. Since the stamped portion 351 is bridge-like in shape, it has elasticity, and when a pressure is applied it is flexed to make the measurement fluid inlet 352 narrower.

A rubber packing 360 which is a one-piece molding seal member is provided around the main body 10A of the pressure sensing element 10 such as to cover the periphery of the main body, an edge portion of the pressured face 16 of the diaphragm 12 as one surface of the main body 10A and an edge portion of the back 15 of the base 11 as the other surface of the main body. The packing 360 constitutes together with the pressure chamber 341 an input section of the input-output policy for effecting the input and output with respect to the main body 10A of the pressure sensing element 10.

Figure 8:
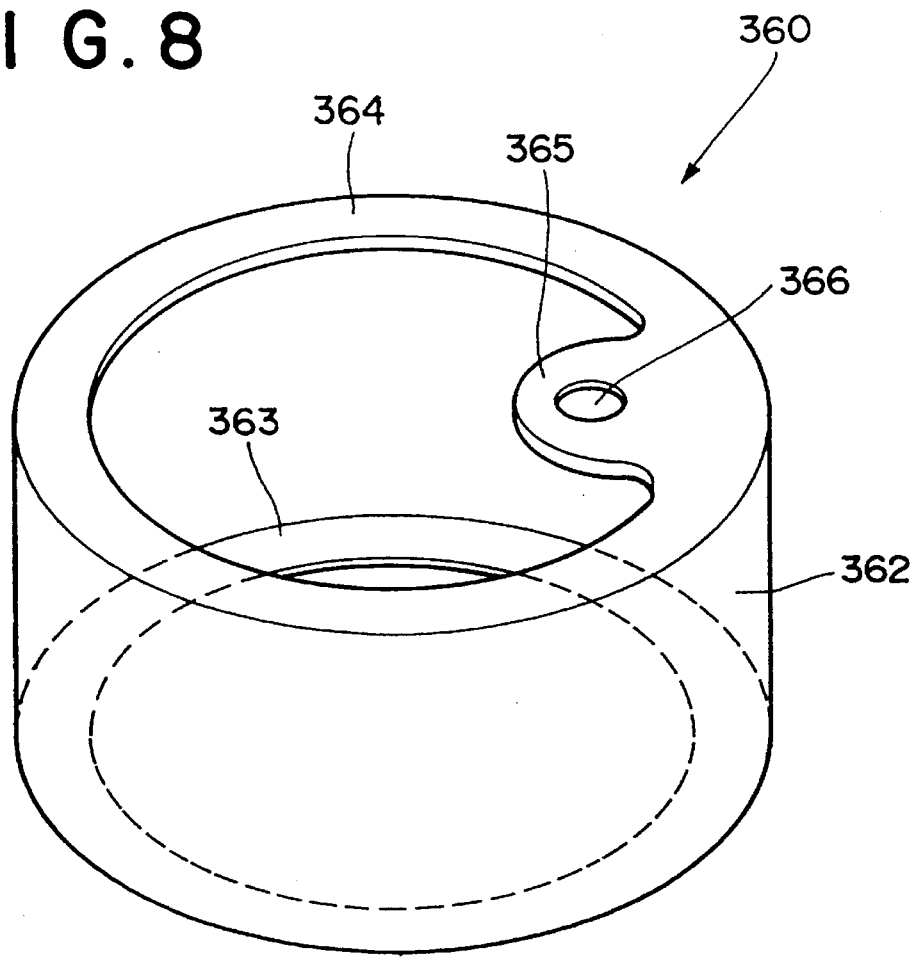
FIG. 8 is a perspective view showing a packing as a seal member in the first embodiment.
Figure 9:
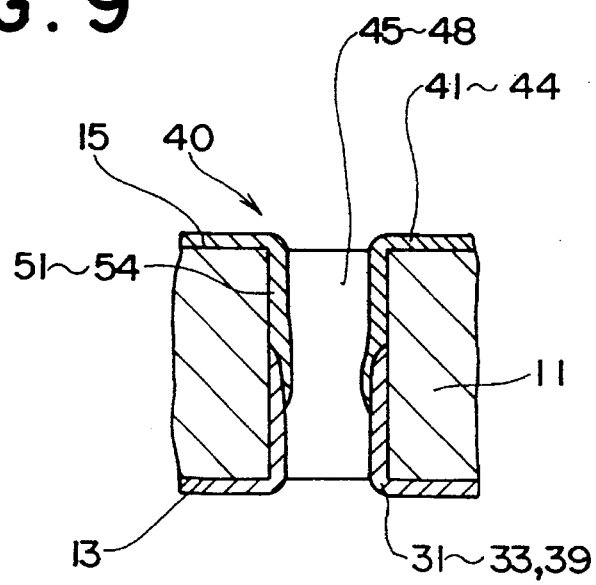
FIG. 9 is a sectional view showing a different essential part in the first embodiment.

FIG. 8 shows the structure of the packing 360 in detail.

The packing 360 has a peripheral portion 362 which covers the periphery of the main body 10A of the pressure sensing element 10, a pressured face portion 363 which covers an edge portion of the pressured face 16 of the diaphragm 12, a back portion 364 which covers an edge portion of the back 15 of the base 11, and a back projection portion 365 projecting from the back portion 364 toward the cylindrical center of the pressure sensing element 10. The back projection portion 365 has a substantially central hole 366.

The packing 360 is tightenedly secured in position by caulking an end portion 333 of the metal case 330 by clamping a substantially ring-like metal mounting member 361 such that the pressured face portion 363 is clamped between the edge portion of the pressured face 16 of the diaphragm 12 and the metal case 330. At the same time, the back portion 364 is clamped between the edge portion of the back 15 of the base 11 and the mounting member 361, whereby the pressure chamber 341 is sealed from the external atmosphere part.

The cover 332 is secured to the metal case 330 by tightening it to an inner projection of the mounting member 361 by a bolt 335.

The cover 332 has a continuity port 370 having an inlet 371 open to atmosphere. A tap 372 is provided in the inlet 371.

The end of the continuity port 370 on the side thereof opposite the inlet 371 (i.e., on the side of the pressure sensing element 10) is in communication with the low pressure port 373 penetrating the base 11 and communicating with the space 30 (i.e., a thorough-hole formed in the electrode hole 47).

The tap 372 is provided for the waterdrop intrusion prevention purpose, that is, for preventing waterdrops attached to the neighborhood of the inlet 371 from entering the space 30 to change the electrostatic capacity or corrode the electrodes 31 to 34.

In the portion in which the continuity port 370 and low pressure port 373 are connected to each other, the back projection portion 365 of the packing 360 is disposed such that the hole 366, Continuity port 370 and low pressure port 373 are located on a straight line. The connection portion is sealed such that the back projection portion 365 of the packing 360 is pushed by the inner projection 334 of the cover 332.

In the first embodiment having the above construction, the pressure on the measurement fluid is detected as follows.

The measurement fluid is led from the measurement fluid introducing path 350 through the measurement fluid inlet 352 to the pressure chamber 341, and the pressure of the measurement fluid acts on the pressured face 16 of the diaphragm 12. At the same time, atmosphere is led from the inlet 371 through the continuity port 370, low pressure port 373 and the thorough-hole formed in the electrode hole 47 to the space 30 in the reference pressure chamber to fill the space 30. At this time, the diaphragm 12 is flexed by the pressure difference between the side of the pressured face 16 and the side of the space 30. Usually, the diaphragm 12 is flexed toward the space 30. When the pressure P1 on the measurement fluid is a negative pressure (i.e., lower than the barometric pressure P2), it is flexed to the opposite side.

The measure circuit 65 detects the changes in the electrostatic capacity values CM and CR due to the changes in the inter-electrode distances of the capacitors 35 and 36 caused by the flexing of the diaphragm 12 and thus produces an output signal that is related to the ratio between the sum of and the difference between the electrostatic capacity values CM and CR of the capacitors 35 and 36.

The relation between the pressure and the output signal is preliminarily calibrated such as to obtain pressure P1 of the measurement fluid corresponding to the detected output signal.

At this time, the measurement fluid that is led into the pressure chamber 341 is sealed by the pressured face and back portions 363 and 364 of the packing 360 and is isolated from the fluid (i.e., atmosphere) providing for the reference pressure, that has been led to the external atmosphere part or the space 30 in the pressure sensor 310.

The reference pressure fluid led into the space 30 is sealed by the back projection portion 365 of the packing 360 and is isolated from the measurement fluid led to the external atmosphere part or the pressure chamber 341 in the pressure sensor 310.

An example of the method of manufacture of the pressure sensing element 10 in the first embodiment of the invention will now be described.

In a step (1), the base 11 and diaphragm 12 are formed by processing a suitable material, for instance alumina ceramics. Alumina (Al2O3) is a typical fine ceramic material having a high melting point, hard and excellent in electric insulation. The thickness of the base 11 is usually about 4 mm. The thickness of the diaphragm 12 varies with the pressure range of the pressure to be measured and also with: the effective diameter of the diaphragm 12. Usually, it is 0.2 to 1.0 mm.

In a subsequent step (2), the individual electrodes and the spacer 20 are formed by printing and baking on the base 11 and the diaphragm 12. The printing and baking may all be done using hybrid IC (HIC) manufacturing techniques and machines.

In a step (2A), the three electrodes, i.e., the mid-gear, reference and shield electrodes 31 to 33, and joining electrode terminal 39 are formed in an arrangement as shown in FIG. 3 and by screen printing on the surface 13 of the base 11. The printing material is palladium paste or the like. Baking is carried out in a continuous furnace at a temperature of 700° to 900° C. The thickness of baking is 5 to 10 μm.

At this time, the individual electrodes 45 to 48 are held sucked by utilizing the vacuum of a vacuum chuck, and palladium paste in printing is charged into the electrode holes 45 to 48 such that it proceeds along the inner wall surface.

In a step (2B), the measure pattern 40 including the individual electrode terminals 41 to 44 is formed in an arrangement as shown in FIG. 4 and by screen printing on the back 15 of the base 11. The printing material is the same palladium paste as that used in the step (2A), and also the method and thickness of baking are the same as in the step (2A).

Again at this time, as in the step (2A), the electrodes 45 to 48 are held sucked by utilizing the vacuum of the vacuum chuck, and palladium paste in printing is charged into the electrode holes 45 to 48 such that it proceeds along the inner wall surface. With the charging of the material by vacuum suction from the side of the surface 13 and also from the side of the back 15, continuity sections 51 to 54 are formed on the wall surfaces of the individual electrode holes 45 to 48, as shown in section in FIG. 9. Thorough-holes are thus formed centrally in the electrode holes 45 to 48. Of the thorough-holes thus formed in the electrode holes 45 to 48, the electrode hole 48 for the common electrode 34 has one end closed with electrically conductive paste 25 (see FIG. 6) in a subsequent step (4). At least one of the other electrode holes 45 to 47 for the mid-gear, reference and shield electrodes 31 to 33 have its opposite ends held open so that it serves as a low pressure port for leading atmosphere to the space 30.

Where the pressure sensing element 10 is mounted in the metal case 30 such as to lead the gas (i.e., atmosphere) under reference pressure P2 for measurement into the space 30 from the outside of the metal case 330 as in this first embodiment, as shown in FIG. 1, the ends of the electrode holes 45 and 46 may be closed as well as the electrode hole 48 to use the thorough-hole formed in the electrode hole 47 as the low pressure port 373 in communication with the continuity port 370.

Figure 6:
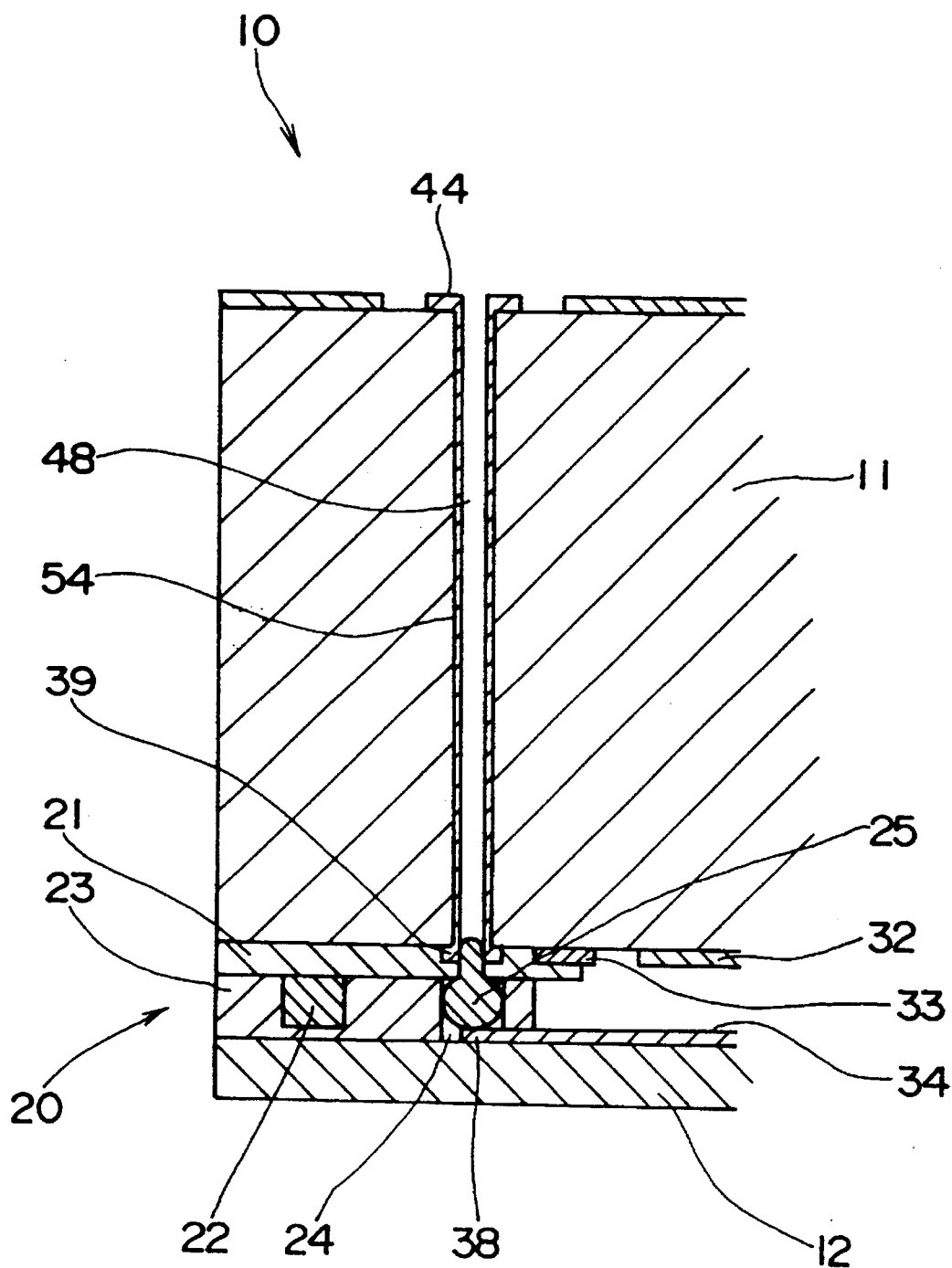
FIG. 6 is a sectional view showing an essential part of the first embodiment.

In a step (2C), the overcoat glass 21 is formed in an arrangement as shown in FIGS. 2 and 6 and by printing on the surface 13 of the base 11. The printing material is passivation glass or the like, and baking is done in a continuous furnace at a temperature of 700° to 900° C. The thickness of baking is 20 to 28 μm.

In a step. (2D), high-melting glass 22 serving as a spacer is formed by printing on the overcoat glass 21 (as shown in FIGS. 2 and 6). The printing material is glass paste. Baking is done in a continuous furnace at a temperature of 700° to 900° C. The thickness of baking is 20 to 50 μm, and it varies with the pressure range of the pressure sensor.

In a step (2E), the low-melting glass 23 for joining is formed by printing on the overcoat glass 21 and then dried the low-melting glass 23 is formed in such an arrangement as to surround the inner and outer sides of the high-melting glass 22, that is, to stride the opposite sides of the high-melting glass 22 (as shown in FIGS. 2 and 6). At this time, for forming the space 24 at a position corresponding to the electrode hole 48, a mask which excludes this portion is used for the printing. The printing material is glass paste. The thickness of baking is 20 to 50 μm, and it varies with the pressure range of the pressure sensor.

In a step (2F), the common electrode 34, which is circular as shown in FIG. 3, is formed by printing on the surface 14 of the diaphragm 12. The printing material is gold resinate, for instance. Baking is done in a continuous furnace at a temperature of 700° to 900° C. The thickness of baking is 0.5 to 1 μm.

In a step (2G), the same material as the low-melting glass 23 for joining used for printing in the step (2E) is printed in an arrangement as shown in FIGS. 2 and 6 on the surface 14 of the diaphragm 12 and then dried. The dry thickness is 20 to 50 μm, and varies with the measurement range of the pressure sensor. With the low-melting glass 23 the thickness after the baking in a subsequent step (3) is greatly reduced compared to with respect to the dry thickness. Therefore, this is taken into considerations at the time of the printing.

It is possible to omit the printing of the low-melting glass 23 in either one of the steps (2E) and (2G) for printing the low-melting glass 23 only on the side of the base 11 or on the side of the diaphragm 12 for joining. In general, the low-melting glass. 23 is printed on at least either side such that it has a sectional shape of arrangement as shown in FIG. 6 after the baking in the subsequent step (3).

Subsequently, in step (3) the base 11 and diaphragm 12 are held such that the opposite surfaces 13 and 14 face each other, and in this state they are joined to each other by baking the low-melting glass 23. The baking temperature is 600° to 700° C.

Subsequently, in a step (4) electrically conductive paste 25 (see FIG. 6) is inserted, in a state that it is attached to the end of a thin wire or the like, into the space 24 through the thorough-hole formed in the electrode hole 48, and is then baked to provide conduction between the common electrode 34 and the electrode terminal 44 provided on the back 15 of the base 11. The baking is usually carried out at a temperature of 600° C. or below.

Finally, in a step (5) pins for connecting the measure circuit 65 in the one chip IC 60 are secured by soft soldering to a portion of the back 15 of the base 11, in which the ends of the circuit paths 61 to 64 are concentrated, i.e., a portion corresponding to the positions of the legs of the one-chip IC 60, and then the one-chip IC 60 is mounted on the pins.

With the above first embodiment, the following effects are obtainable.

Since the packing 360 that is provided in the pressure sensing element 310 is a one-piece molding and disposed such as to cover the entire periphery of the main body 10A of the pressure sensing element 10, an edge portion of the pressured face 16 and an edge portion of the back 15, it is possible to eliminate such deficiencies as generation of positional deviation, degradation of the packing 360 and production of imperfect seal when assembling the packing 360 in the casing 330 of the pressure sensor 310.

Thus, it is possible to detect the pressure on the measurement fluid accurately by preventing the leakage of pressure in the pressure chamber 341. In addition, it is possible to prevent measurement fluid from entering the measure circuit 65 or the like provided in the one-chip IC 60 in the pressure sensor 310, thus preventing otherwise possible measurement error generation.

Further, since the back portion 364 of the packing 360 extends up to an edge portion of the back 15 of the pressure sensing element 10, even in case when the seal at the edge portion of the pressure face 16 is deteriorated by flexing of the diaphragm 12 toward the base 11 that may be caused with a pressure increase in the pressure chamber 341, it is possible to ensure reliable seal as a whole for the seal is made on the back 15.

Further, since the packing 360 is provided such as to cover the main body 10A of the pressure sensing element 10, an external force that may be applied to the casing 330 has no direct effects on the pressure sensing element 10, and the pressure sensing element 10 can be protected by the elasticity of the packing 360.

It is thus possible to preclude the inconvenience that error is generated in the measurement with straining of the main body 10A of the pressure sensing element 10. In addition, it is possible to prevent the measure circuit 65 or the like provided in the one chip IC 60 in the pressure sensing element 10 from life reduction with vibrations.

Further, since the back projection portion 365 of the packing 360 is sealing the space 30 in the reference pressure chamber, and also the continuity port 370 and low pressure port 373 forming the path for leading the reference pressure fluid to the space 30, these seals can be obtained without provision of any separate seal member.

The number of components thus can be reduced, thus facilitating the assembling, permitting cost reduction and permitting ready management of components.

Further, since the packing 360 seals individual pressure parts in the pressure sensor 310 without need of any complicated seal structure, it is possible to reduce the size of the pressure sensor.

Further, the measure pattern 40 provided on the back 15 of the base 11, circuit paths 64A and 63B are disposed such as to enclose the circuit path 64 including the electrode terminal 44 for the common electrode 34. Circuit path 61 including the electrode terminal 41 for the mid-gear electrode 31 and the circuit path 62 including the electrode terminal 42 for the reference electrode 32 are thus isolated by the circuit paths 63A and 63B from circuit path 64 and the electrode terminal 44 for common electrode 34.

Thus, when the relative humidity of the atmosphere touching the measure circuit 40 is increased, the leakage current from the circuit paths 61 and 62 for the respective mid-gear and reference electrodes 31 and 32 to the circuit path 64 for the common electrode 34, can be absorbed by the circuit paths 63A and 63B for the shield electrode 33. Highly accurate measurement thus can be obtained.

Further, by reducing the effects of changes in the relative humidity of atmosphere with such arrangement of the measure pattern 40, it is possible to preclude the inconvenience that the pressure sensor 310 is increased in size in order to obtain an electrostatic capacity change to such an extent that the effects of the leakage current is are ignorable.

Further, unlike the prior art, there is no need of tight sealing the atmosphere touching the measure pattern 40 for reducing the effects of the relative humidity change. Thus, it is possible to dispense with components and steps for the tight seal, thus permitting cost reduction. In addition, a space for the tight seal is not necessary. This means that it is possible to reduce the size of the pressure sensor 310.

Further, the back 15 of the base 11 may be provided with commonly termed potting, that is, a process of covering the measure pattern 40 with a fused resin or the like that is dropped such as to close the end of at least one of the thorough-holes formed in the electrode holes 45 to 47 capable of being utilized as low pressure port (in the first embodiment the inlet portion of the electrode hole 47 serving as the low pressure port 373. As the potting material may be used polyurethane resin or the like.

With the above arrangement of the measure pattern 40 the effects of external disturbances can be reduced, thus permitting detection of weak currents as well. It is thus possible to increase the amplification sensitivity of the amplification component and provide pressure sensing element such that it has a minute capacity. That is, it is possible to reduce size of the pressure sensing element.

Further, the measure circuit 65 is entirely accommodated in the one-chip IC 60, which is in turn mounted directly on the measure pattern 40 on the back 15 of the base 11. Thus, unlike the prior art example in which the measure circuit comprising a large number of components is mounted on a printed base or the like provided as a separate member, it is possible to reduce the number of components of the measure circuit and omit the printed base or like member for mounting the circuit components thereon. The number of components thus can be reduced.

Since the steps of mounting the components of the measure circuit and the printed base can be greatly dispensed with, the manufacturing process can be simplified. Further, since the space for installing the printed base can be omitted, the size reduction of the pressure sensor 310 is obtainable.

Further, since the electrode on the side of the base 11 is divided into three electrodes, i.e., the mid-gear, reference and shield electrodes 31 to 33, it is possible that the ceramics as the material of the base 11 near the spacer area 20, low-melting glass 23 of the spacer 20, etc. have effects on only the outermost capacitor 37 (with electrostatic capacity CS) on the side of the spacer 20 and do not have any effect on the inner capacitors 35 and 36 (with electrostatic capacity values CM and CR). That is, with the presence of the spacer 20 the electric lines of force connecting the shield and common electrodes 33 and 34 are formed such that they are convex outward, so that the electrostatic capacity CS is affected by the dielectric constant change with changes in the relative humidity of the ceramics, low-melting glass 23, etc. On the other hand, the electric power lines connecting the mid-gear, reference and common electrodes 31, 32 and 34, extend substantially straight and normally through the space 30. Thus the electrostatic capacitance values CM and CR are affected only by the dielectric constant of the atmosphere in the space 30.

Thus, by arranging such that the outermost shield electrode 33 on the side of the joining area 20 is not used for measurement but is grounded and permitting measurement to be made with the inner mid-gear and reference electrodes 31 and 32, accurate measurement may be made without being adversely affected by the ceramics or the low-melting glass 23 as noted above.

Further, as shown in FIG. 7, by the circuit 70 the voltage V at the output terminal 78 is made to be $$V \propto VO = \{(CR-CM)/(CR+CM)\} \times VI,$$

and thus it is possible to obtain an output signal related to the ratio between the sum of and the difference between the electrostatic capacity values CM and CR of the capacitors 35 and 36. Thus, in case when the electrostatic capacity values CM and CR are changed with changes in the dielectric constant of the atmosphere in the space 30 caused due to the influence of the temperature, relative humidity, etc., the influence can be made up for. It is thus possible to improve the measurement accuracy in addition to the effects of provision of the shield electrode 33 noted above.

The electrostatic capacity values CM and CR are given as $$CM = \epsilon \times AM/(DM-DMP) \text{ and } CR = \epsilon \times AR/(DR-DRP)$$

where AM and AR are areas of the electrodes, DM and DR are inter-electrode distances, DMP and DRP (DMP>DRP) are changes in the inter-electrode distances. Thus, when the dielectric constant $\epsilon$ is changed due to the influence of the temperature, relative humidity, etc. of the atmosphere in the space 30, the effects can be canceled because the voltage V at the output terminal 78 represents the ratio between the sum of and the difference between the electrostatic capacity values CM and CR.

Further, the electrodes can be readily produced because the mid-gear electrode 31 is circular while the reference and shield electrodes 32 and 33 are ring-like.

Further, since the common electrode 34 is circular, the operation of joining the base 11 and diaphragm 12 can be carried out without taking the directivity into considerations, thus facilitating the manufacture.

Further, since the outer edge portion 38 of the circular common electrode 34 is located on the outer side of the edge of the outermost shield electrode 33 on the side of the base 11, it is possible to readily realize the take-out of the electrode terminal 44 for the common electrode 34 to the back 15 of the base 11.

Further, the shield electrode 33 can absorb the leakage current, i.e., leak-off electric current, which may flow from the reference electrode 32 to the common electrode 34 in the event of the reduction of the resistance at the creepage distance of insulation of the ceramics, the low-melting glass 23 constituting the joining area 20, etc. with relative humidity increase. Since the shield electrode is not used for measurement, its provision has an effect of reducing the adverse effects of the relative humidity in the measurement.

Further, since the spacer 20 has the high-melting glass 22 serving as a spacer and the surrounding low-melting glass 23 for joining, the space between the base 11 and diaphragm 12, i.e., the inter-electrode distance T, may be readily set to a parallel and predetermined space by adjusting the thickness of the high-melting glass 22.

Further, the spacer 20 has the overcoat glass 21, which has an effect of increasing the creepage distance of insulation between the shield and common electrodes 33 and 34 to increase the flange face resistance, and thus it is possible to reduce the leakage current between these electrodes.

By printing the overcoat glass 21 such as to cover not only a portion of the shield electrode 33 but also the mid-gear and reference electrodes 31 and 32, it is possible to prevent the short-circuit of these electrodes to the common electrode 34 due to excessive deformation of the diaphragm 12.

Further, the overcoat glass 21 covers a portion of the shield electrode 33, and its portion on the side of the reference electrode 32 is exposed to the atmosphere in the space 30. Thus, leakage current generated from the reference electrode 32 may be readily absorbed. It is thus possible to improve the effect of preventing the leakage current from the reference electrode 32 along the flange face of the spacer 20 to the common electrode 34 with the above shield electrode 33.

Further, the space 24 that is preliminarily provided in the low-melting glass 23 and overcoat glass 21, can prevent the electrically conductive paste 25 for taking out the common electrode 34 to the outside from getting into the space 30 when it is inserted.

Further, the path or leading atmosphere under the reference pressure for measurement to the space 30 (i.e., low pressure port) is secured by utilizing the thorough-holes formed in the electrode holes 45 to 47. (In this first embodiment the thorough-hole formed in the electrode hole 47 is utilized as the low pressure port 373). The low pressure port thus can be secured with the sole steps (2A) and (2B) for making the measure pattern on the side of the back 15 of the base 11 to be in conduction with the individual electrodes on the side of the opposite surface 13.

Further, since the measure pattern 40 on the side of the back 15 of the base 11 and the mid-gear, reference and shield electrodes 31 to 33 and the joining electrode terminal 39 on the side of the opposite surface 13 comprise a print of palladium paste which has low viscosity and can be excellently developed, these parts can be reliably made to be in conduction. In addition, it is possible to obviate the inconvenience in the conduction between gold resinate and palladium paste that are used as a general combination, that is, the inconvenience that conduction failure takes place due to generation of a phenomenon of corrosion of the gold side, i.e., diffusion of gold resinate as one of the two different materials into palladium paste as the other material in a portion in which these two different materials are in contact with each other.

Further, printing the measure pattern 40 on the side of the back 15 of the base 11 and the mid-gear, reference and shield electrodes 31 to 33 on the side of the opposite surface 13 with gold resonate and processing the thorough-holes in the electrode holes 45 to 48, result in a thin finish of gold resinate. In this case, the amount of print of the continuity sections 51 to 54 is extremely small, so that conduction failure is liable. With the processing of the thorough-holes using palladium paste for both sides as in this embodiment, the above inconveniences are not present, and it is possible to obtain conduction reliably.

Further, when the pressure sensor 10 receives impact pressure due to the measurement fluid, the impact pressure is directly received in the stamped portion 351, and thence is transmitted through the measurement fluid inlet 352 to the pressured face 16 of the diaphragm 12.

Thus, the impact pressure does not directly act on the pressured face 16 of the diaphragm 12. It is thus possible to protect the pressured face 16.

Further, the pressure sensor 310 receives an impact pressure, the stamped portion 351 is deformed according to the change in the pressure P1 on the measurement fluid such that it is flexed in the direction of propagation of pressure in the measurement fluid introducing path 350, thus changing the size of the opening of the measurement fluid inlet 352. Thus, it is possible to further reliably protect the pressured face 16 of the diaphragm 12.

In this case, the greater the rate of change in the impact pressure, the stamped portion 351 is changed the more to reduce the opening of the measurement fluid inlet 352 furthermore. Thus, it is possible to obtain protection of the pressured face 16 according to the pressure change.

The measurement fluid is introduced into the pressure chamber 341 such that it bypasses the stamped portion 351 to pass through the the measurement fluid inlet 352. Thus, if solid foreign particles are contained in the measurement fluid, they are caught in the slit and do not enter the pressure chamber 341, that is, they do not reach the diaphragm 12. Thus, the pressured face can be reliably protected.

Further, the waterdrop intrusion prevention tap 372 that is provided in the opening 371 prevents the inconvenience that waterdrops attached to the neighborhood of the opening 371 enter the space 30 as the reference pressure chamber to cause electrostatic capacity changes or corrosion of the electrodes 31 to 34.

Figure 10:
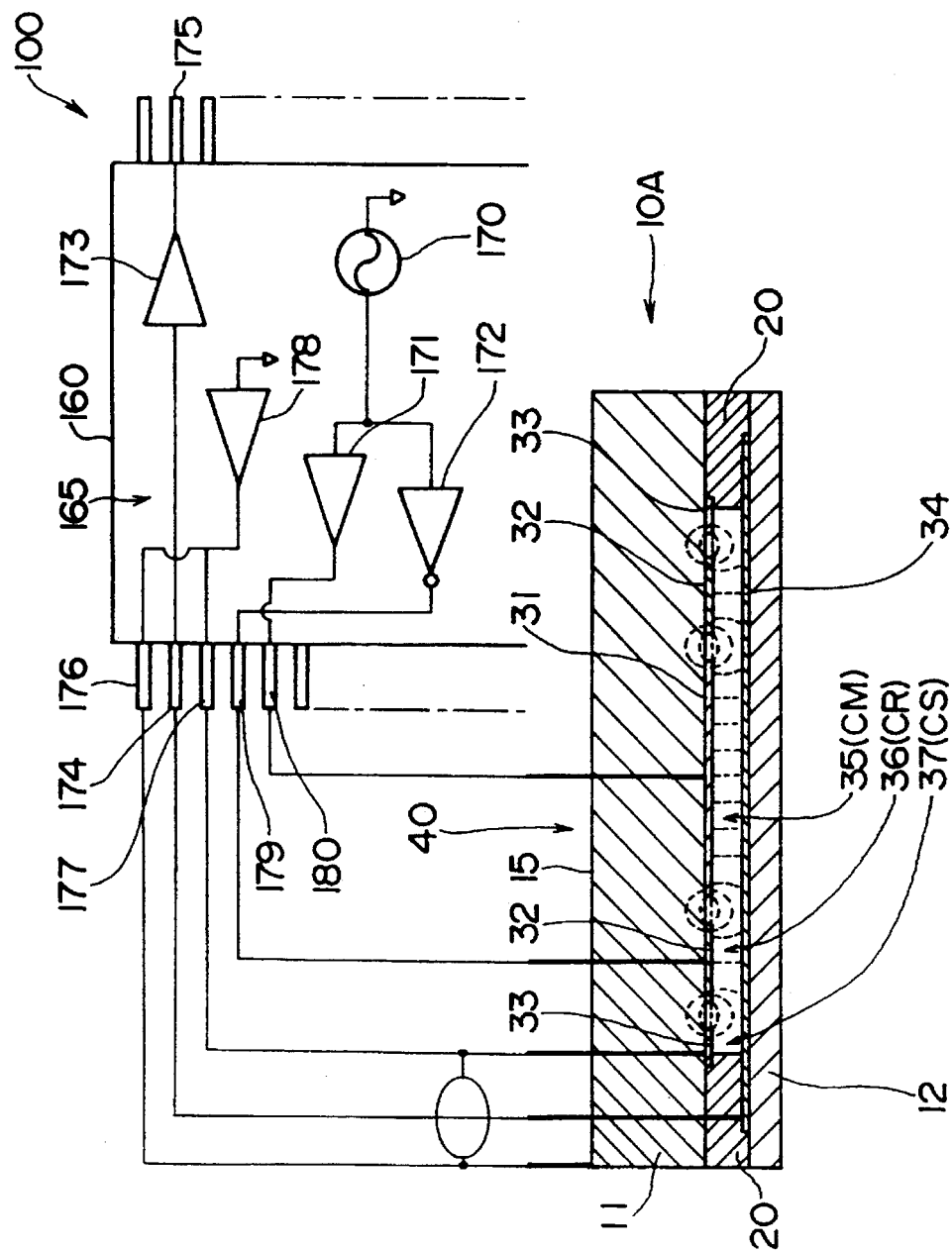
FIG. 10 is a schematic representation of a second embodiment of the invention.
Figure 11:
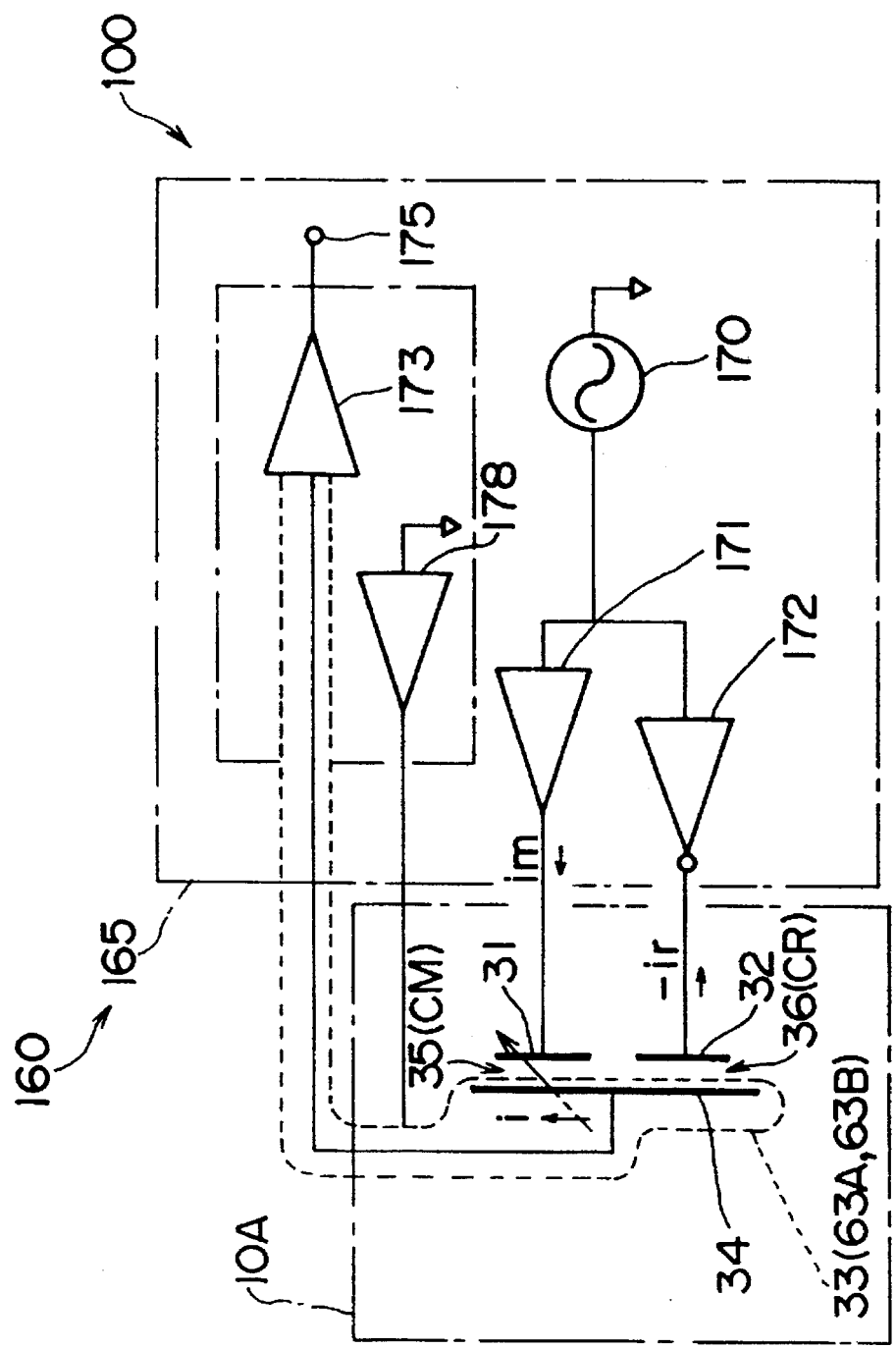
FIG. 11 is a view for explaining a measure circuit in the second embodiment.

FIGS. 10 and 11 show a pressure sensing element 100 based on the electrostatic capacity method in the second embodiment of the invention. The pressure sensing element 100, like the pressure sensing element 10 in the first embodiment, is accommodated in the metal case 330 and constitutes the pressure sensor.

Except the measure circuit provided in the one-chip IC, the pressure sensing element 100 is substantially the same in the construction and functions, as the previous first embodiment, and also it is produced in the same way. Like parts are designated by like reference numerals. They are not described in detail, and only different parts will be described.

FIG. 10 shows the state of connection between the main body 10A of the pressure sensing element 100 and a measure circuit 165 for measuring the electrostatic capacity values CM, CR and CS of the capacitors 35 to 37 formed in the main body 10A. FIG. 11 shows the principles underlying the measurement. On the back 15 of the base 11, the same measure pattern 40 as in the above first embodiment as shown in FIG. 4 is formed, and it is mounted directly on the one-chip IC 160 which includes the measure circuit 165.

Referring to FIGS. 10 and 11, the measure circuit 165 includes an oscillator VCO (alternating-current power supply) 170. The voltage of the oscillator VCO 170 is coupled through operational amplifiers 171 and 172 to be impressed as accurate non-inverted and inverted signals upon the capacitors 35 and 36 (with respective electrostatic capacity values CM and CR). At this time, the voltages VM and VR that are generated between the electrodes of the capacitors 35 and 36 meet dVM/dt=IM/CM and dVR/dt=IR/CR, and the currents IM and IR through the capacitors 35 and 36 are proportional to the respective electrostatic capacitance values CM and CR. The signal that is impressed by the oscillator VCO 170 may be a sine wave or a triangle wave.

To an input terminal 174 of the operational amplifier 173 as an amplification component flows a current I which is proportional to the difference (CM–CR) between the capacitance values of the capacitors 35 and 36. Thus, by setting the electrostatic capacity values CM and RM to be substantially equal and disposing the capacitors 35 and 36 the changes ΔCM and ΔCR in the electrostatic capacity values CM and RM corresponding to the flexing of the diaphragm 12 caused by the pressure on the measurement fluid are ΔCM>ΔCR, that is, by disposing the capacitor 35 (with capacitance value CM) in correspondence to a central part of the diaphragm where the flexing is large, it is possible to obtain at the output terminal 175 of the operational amplifier 173 an output signal as a function of the measurement fluid pressure that is acting on the pressured face 16 of the diaphragm 12.

In FIG. 10, dashed lines show electric lines of force between electrodes. The electric lines of force in this state are formed such that their direction is inverted in a constant cycle according to the signal of the oscillator VCO 170.

The circuit paths 63A and 63B which are in conduction with the electrode terminal 43 for the shield electrode 33 (see FIGS. 4 and 5), are disposed such as to enclose the circuit path 64 including the electrode terminal 44 for the common electrode 34, and they are connected from ground terminals 176 and 177 to a buffer element 178 to be grounded. The ground terminals 176 and 177 are disposed such as to isolate the input terminal of the operational amplifier 173 and signal impression terminals 179 and 180 from the operational amplifiers 171 and 172.

With this second embodiment, substantially like the first embodiment, it is possible to obtain highly accurate measurement, size reduction of the pressure sensor and so forth.

Further, in the second embodiment the output is detected as the difference (CM–CR) between the capacitance values of the capacitors 35 and 36. Thus, although it is difficult to avoid the effects of changes in the dielectric constant with changes in the temperature and relative humidity of the atmosphere in the space 30 as in the first embodiment, as in the first embodiment it is possible to avoid the effects of the ceramics and the low-melting glass 23 owing to the provision of the shield electrode 33. Besides, with the second embodiment the above effects can be realized with a simple circuit compared to the first embodiment.

Figure 12:
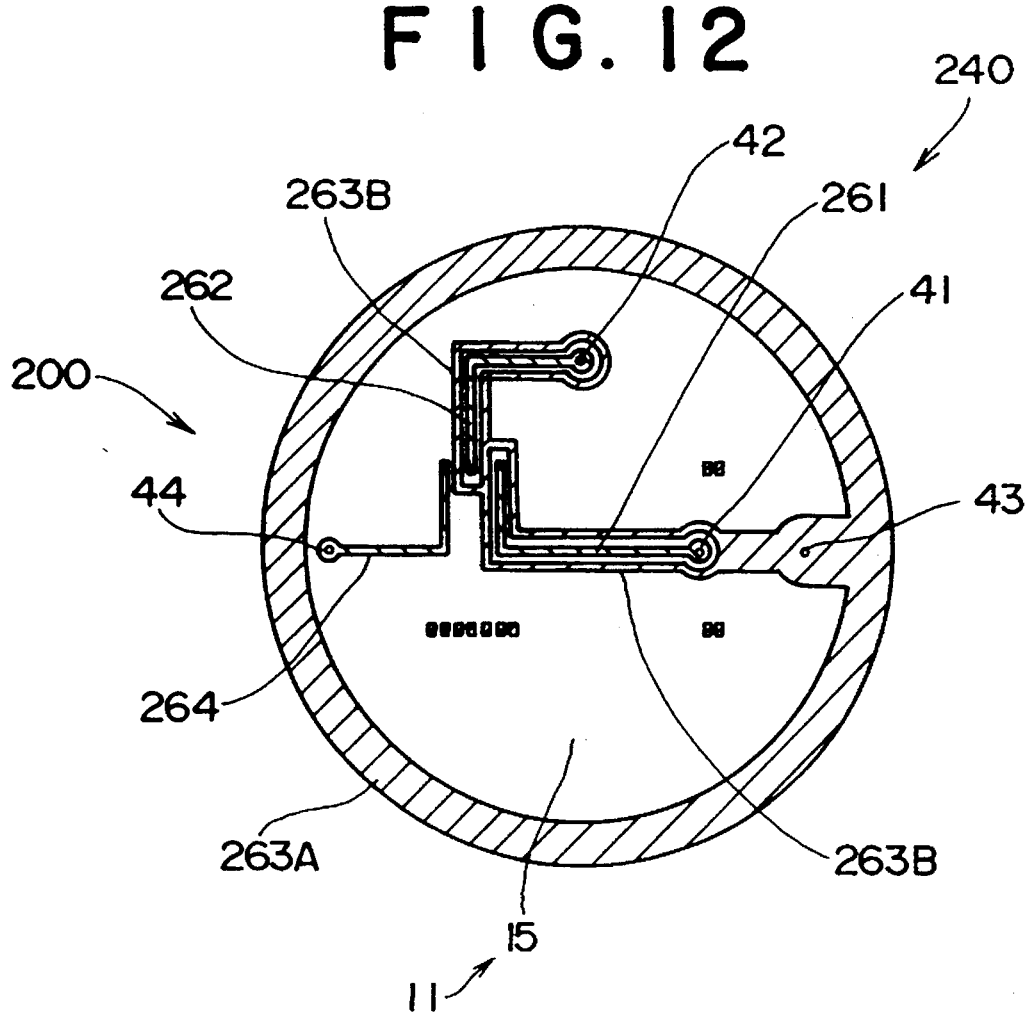
FIG. 12 is a view showing a measure pattern on the back in a third embodiment of the invention.
Figure 13:
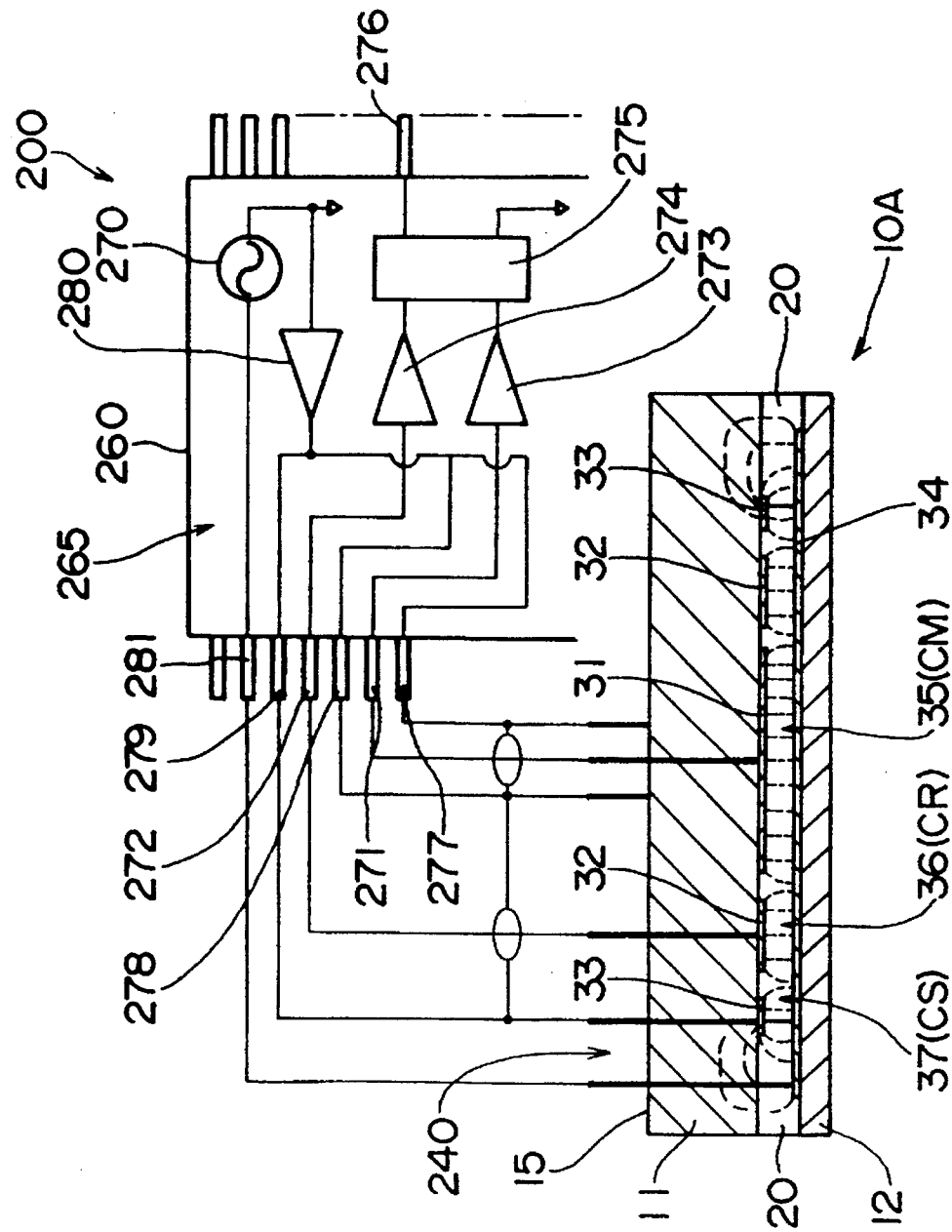
FIG. 13 is a schematic representation of the third embodiment.
Figure 14:
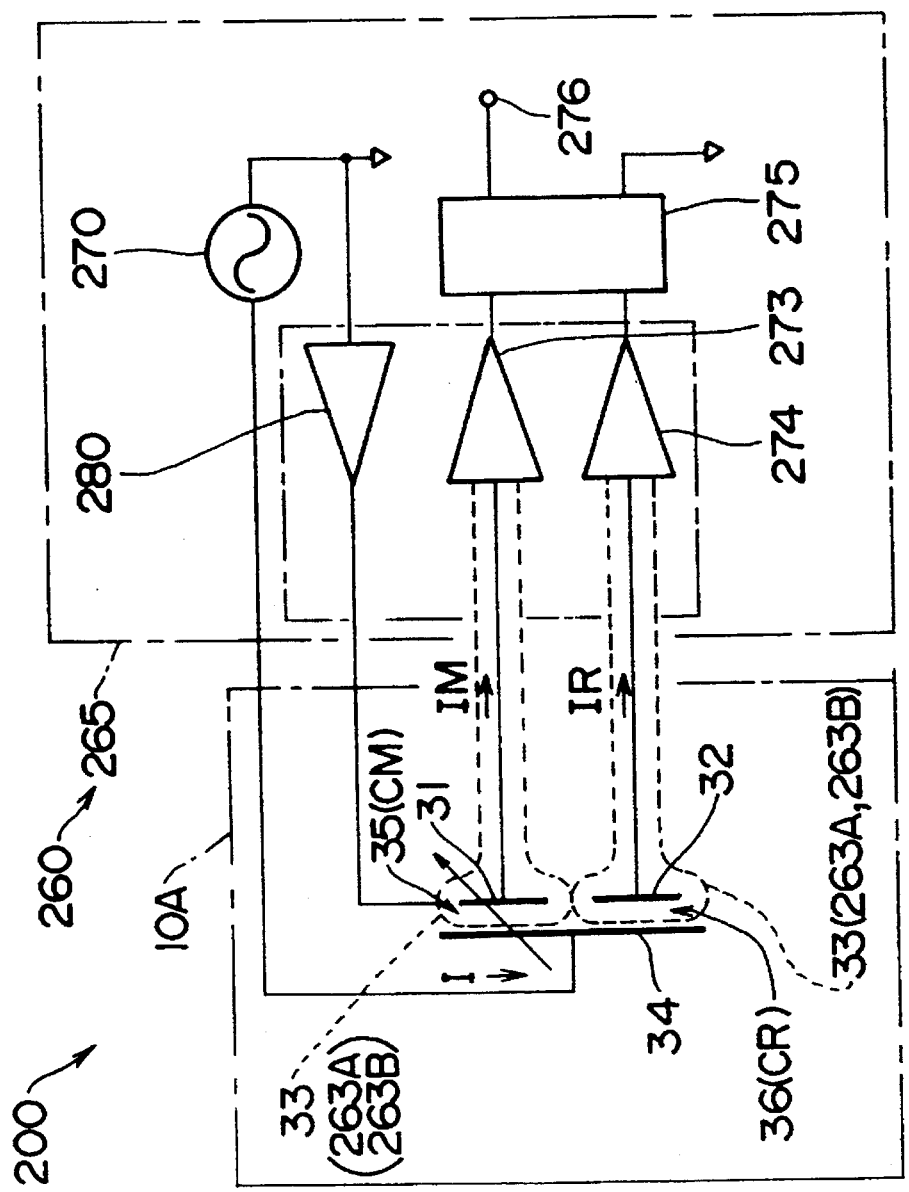
FIG. 14 is a view for explaining a measure circuit in the third embodiment.

FIGS. 12 to 14 show a pressure sensing element 200 based on the capacitance measurement method in a third embodiment of the invention. The pressure sensing element 200, like the pressure sensing element 10 in the first embodiment, is accommodated in a metal case 330 to constitute the pressure sensor.

Except the measure circuit provided in the one-chip IC and the measure pattern on the back of the base, the pressure sensing element 200 is substantially the same in construction and functions as the previous first and second embodiments, and it is produced in the same method. Like parts are, therefore, designated by like reference numerals. Their detailed description is not given, and only different parts will be described.

FIG. 12 shows the detailed structure of the measure pattern 240 of the pressure sensing element 240. FIG. 13 shows the state of connection between the main body 10A of the pressure sensing element 200 and a measure circuit 265 for measuring changes in the capacitance values CM, CR and CS of the capacitors 35 to 37 formed in the main body 10A. FIG. 14 shows the principles underlying the measurement.

Referring to FIG. 12, a measure pattern 240 which is different from those in the first and second embodiments are provided on the back 15 of the base 11 of the pressure sensing element 200. A one-chip IC 260 is adapted to be mounted directly on the electrode pattern 240. FIG. 12 shows a state before the mounting of the one-chip IC 260.

In the measure pattern 240 in this third embodiment, electrode terminals 41 to 43 for the mid-gear, reference and shield electrodes 31 to 33 are provided at the same positions as in the measure pattern 40 in the first and second embodiments (see FIGS. 4 and 5). Key-shaped circuit paths 261, 262 and 264 are led from the electrode terminals 41, 42 and 44 to the pin positions of the one-chip IC 260. They are the same in the shape and arrangement as the circuit paths 61, 62 and 64 in the first and second embodiments. A ring-like circuit path 263A is formed on an outer edge portion of the back 15 of the base 11 such that it is in conduction with the electrode terminal 43. It is the same in the shape and arrangement as the circuit path 63A in the first and second embodiments.

The measure pattern 240 in the third embodiment has a circuit path 263B, which is different in shape and arrangement from the circuit path 63B in the measure pattern 40 in the first and second embodiments. In the first and second embodiments, the circuit path 63B in the measure pattern 40 is connected to the left inner portion in FIG. 3 of the ring-like circuit path 63A and is arranged such as to enclose the electrode terminal 44 for the common electrode 34 and the circuit path 64. In contrast, in the third embodiment the circuit path 263B of the measure pattern 240 is connected to the right inner projection in FIG. 9 of the ring-like circuit path 263A and is arranged such as to enclose at regular intervals circuit path 261 including the electrode terminal 41 for the mid-gear electrode 31 and circuit path 262 including the electrode terminal 42 for the reference electrode 32. The circuit path 263B passes through leg positions of the one-chip IC 260 which are in an alternate arrangement with the ends of the circuit paths 261 to 264. The circuit paths 263A and 263B which are in conduction with the electrode terminals 43 for the shield electrode 33 are grounded.

Thus, the circuit path 264 including the electrode terminal 44 for the common electrode 34, the circuit path 261 including the electrode terminal 41 for the mid-gear electrode 31 and the circuit path 262 including the electrode terminal 42 for the reference electrode 32, are isolated from one another by the circuit paths 263A and 263B which function as grounding electrodes. Thus, it is possible to increase the effects of an increase of the leak-off electric current with reduction of the insulation resistance between electrodes.

Referring to FIGS. 13 and 14, in the measure circuit 265 in the third embodiment, unlike the measure circuit 165 in the second embodiment, power is applied from the side of the common electrode 34.

The measure circuit 265 includes an oscillator VCO (alternating-current power supply) 270. The signal of the oscillator VCO is impressed from the common electrode 34 on the capacitors 35 and 36 (with respective electrostatic capacity values CM and CR), thus causing excitation of these capacitors to cause a current I. At this time, currents IM and IR proportional to the electrostatic capacity values CM and CR flow to input terminals 271 and 272. These input signals are amplified in operational amplifiers 273 and 274, and their difference is calculated in a circuit 275 and output to an output terminal 276. Thus, at an output terminal 276 an output signal can be obtained, which as a function of the pressure on the measurement fluid acting on the pressure face 16 of the diaphragm 12. The signal that is impressed from the oscillator VCO may be a sine wave or a triangle wave.

In a specific numerical example, if the pressure sensor has a specification of 0 to 2,000 mm $H_2O$, and AC signal is applied from the oscillator VCO, If the electrostatic capacity values CM and CR are 30 pF, the flexing of the diaphragm 12 usually causes a change in the electrostatic capacity CM of the capacitor 35 by 6 to 8 pF while causing the electrostatic capacity CR of the capacitor 36 by 1 to 2 pF. As a result, the difference between the two electrostatic capacity values is 5 to 6 pF.

Dashed lines in FIG. 13 show electric lines of force between electrodes. The electric lines of force are formed in this state while the direction is inverted in a predetermined cycle according to the signal of the oscillator VCO 270.

The circuit paths 263A and 263B which are in conduction with the electrode terminal 43 of the shield electrode 33 (see FIG. 12), are disposed to separately enclose the circuit paths 261 and 262 including the respective mad-gear and reference electrodes 31 and 32 (corresponding to dashed lines in FIG. 14), and thence connected through ground terminals 277 to 279 to a buffer element 280. The ground terminals 277 to 279 are disposed such as to isolate a signal impression terminal 281 from the oscillator VCO 270 and input terminals 271 and 272 to the operational amplifiers 273 and 274. It is thus possible to reduce the effects of an increase of the lead-of electric current with reduction between the insulation resistance between these input terminals.

With this third embodiment, like the first and second embodiments noted above, it is possible to increase the accuracy of measurement and reduce the size of the pressure sensor.

In the third embodiment the circuit 275 takes the difference between the currents IM and IR and detects the outpout. Therefore, it is impossible to avoid the effects of changes in the dielectric constant with changes in the temperature and relative humidity of the atmosphere in the space 30 as in the first embodiment. However, since the shield electrode 33 is provided, like the first embodiment, it is possible to avoid the effects on the ceramics and low-melting glass 23. Further, in the third embodiment the above effects can be realized with a simple circuit compared to the first embodiment.

The above embodiments are by no means limitative, and various changes and modifications may be made, and the invention covers other structures which can attain the object of the invention.

In the first embodiment, the space 30 as the reference pressure chamber and the continuity port 370 and low pressure port 373 as the path for leading the reference pressure fluid to the space 30, are sealed by the projection 365 of the back of the packing 360. However, it is possible to obtain the seal with the back 364 without provision of the projection of the back projection 365 but providing the back 364 with a hole corresponding to the hole 366. Further, it is possible to obtain seal with a different part of the packing 360. In general, any arrangement may be used used so long as a seal can be obtained by making use of a portion of the packing 360 in accordance with the position of arrangement of the continuity port 370 and low pressure port 373.

Further, instead of the seal of the space 30 as the nomical pressure chamber by the projection 365 of the back of the packing 360, it is possible to seal the packing 360 with a separate seal member. Further, it is possible to obtain protection of the pressure sensing element from external forces and vibrations and size reduction of the pressure sensor 310.

Further, the shape and size of the packing 360 can be set appropriately in correspondence to the shape and size of the main body 10A of the pressure sensing element 10.

Further, the periphery of the packing 360 and the periphery of the main body 10A of the pressure sensing element 10 may be spaced apart or in close contact with each other.

Further, in the first embodiment the packing 360 is made of rubber, but it is possible to use any material so long as it can function as a seal material and is elastic such that it can absorb external forces and vibrations.

Further, in the first embodiment the pressure P2 that is led to the space 30 as the reference pressure chamber is the barometric pressure, and the pressure P1 on the measurement fluid is detected as gauge pressure with reference to the barometric pressure. However, it is possible to provide a tube joint 374 as shown in FIG. 15 on a cover 332 instead of the opening 371 with the waterdrop intrusion prevention tap 372 provided therein for introducing the measurement fluid (i.e., gas in this case) into the space 30 as the reference pressure chamber and permitting comparative measurement such as to detect the pressure difference between the pressure P2 in the space 30 and the pressure P1 in the pressure chamber 341.

Figure 15:
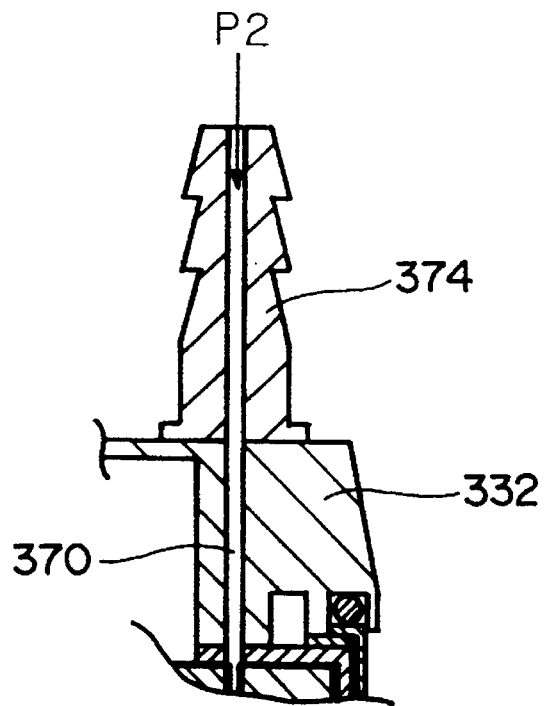
FIG. 15 is a sectional view showing a modification according to the invention.

Further, where the tube joint 374 is provided as shown in FIG. 15, it is possible to open the tube joint 374 to the barometric pressure for the gauge pressure detection if due consideration is given to prevent intrusion of waterdrops.

Further, the measurement fluid which is led as the subject of pressure measurement to the pressure chamber 34 of the pressure sensor 310, may be either liquid or gas.

Further, the invention is applicable not only to the pressure sensor 310 based on the electrostatic capacity method and having the low pressure port 373 as in the first embodiment, but is also applicable to an absolute pressure measurement type structure, which does not have and low pressure port 373, and in which a portion corresponding to the space 30 is sealed with vacuum.

Further, the measure patterns 40 and 240 on the back 15 of the base 11 (see FIGS. 4 and 12), are not limited to those of the arrangements and structures in the above individual embodiments, and it is possible to appropriately select the positions of the electrode terminals 41 to 44 on the back 15 and also the refraction, curvature, form, thickness, etc. of the circuit paths 61 to 64 and 261 to 264, that is, the arrangement and structure may be selected to meet the purpose. Further, if the effect of size reduction of the the pressure sensor is to be obtained by directly mounting each one-chip IC 60, 160 or 260, any arrangement and structure may be adopted to permit direct mounting of the one-chip IC 60, 160 or 260. Further, if the effect of improvement of the measurement accuracy is to be obtained by eliminating the effect of the leakage current with a special arrangement of the measure pattern 40, any arrangement and structure may be used so long as the electrode terminals 41 and 42 for the mid-gear and reference electrodes 31 and 32, the circuit paths 61 and 62 connected to the electrode terminals 41 and 42, the electrode terminal 44 for the common electrode 34 and the circuit path 64 connected to the electrode terminal 44 are enclosed by the circuit paths 63A and 63B connected to the electrode terminal 43 for the shield electrode 44.

Further, in the measure pattern 240 the electrode terminal 41 for the mid-gear electrode 31, the circuit path 42 connected to the electrode terminal 41, the electrode terminal 42 for the reference electrode 32 and the circuit path 262 connected to the electrode terminal 42 are enclosed by the circuit paths 263A and 263B connected to the electrode terminal 43 for the shield electrode 33. However, of the circuit path 263B a portion which is present between the ends of the circuit paths 261 and 262 may be absent. That is, the electrode terminal 41 and circuit path 261, and the electrode terminal 42 and circuit path 262, may not be enclosed independently. In general, it is necessary that these electrode terminals and circuit paths, and the electrode terminal 44 for the common electrode 34 and the circuit path 264 connected to the electrode terminal 44, need be enclosed independently.

Further, in the measure pattern 40 in the first and second embodiments, it is possible to omit the circuit paths 61, 62 and 64 connected to the electrode terminals 41, 42 and 44 and connect the electrode terminals 41, 42 and 44 to leg positions of the one-chip IC 60 or 160. This arrangement can also apply to the circuit paths 261, 262 and 264 in the measure pattern 240 in the third embodiment.

Further, the electrodes 31 to 34 in the individual embodiments may have any shape. For example, they may be polygonal or polygonal ring-like instead of being circular or ring-like in shape. Further, the method of forming the electrodes 31 to 34 in the process of manufacture in the above individual embodiments, is by no means limitative; for instance, they may be formed by metal plating, etching, spattering and-other means that are usually employed instead of the screen printing.

Further, according to the invention the numerical values of the thicknesses of the base 11 and diaphragm 12, thicknesses of the electrodes 31 to 34, inter-electrode distances, electrostatic capacitance values CM, CR and CS of the capacitors 35 to 37, specifications of the pressure sensor, etc., are not limited to those specifically shown in the individual embodiments, and they may be suitably determined in dependence on the subject or environments of the measurement.

Further, each of the measure patterns 40 and 240 may have other structures which include the electrode terminals 41 to 44 and portions corresponding to the leg positions of the one-chip IC 60 or 260. For example it is possible to connect the electrode terminals 41 to 44 and the legs of each of the one-chip ICs 60, 160 and 260 by providing, in lieu of the circuit paths 61 to 64 or 261 to 264, lead wires, bonding wires, etc. In any structure, it is possible to obtain an effect of size reduction of the pressure sensor by direct mounting each of the one-chip ICs 60, 160 and 260 on the back 15 and also an effect of improving the seal by the provision of the packing 360 as the seal material.

Further, in the measure circuit 65 in the first embodiment, the circuit provision, zero point adjustment provision, span adjustment provision and linearity compensation provision are not limited to the circuit 70, zero point adjustment circuit 71, span adjustment circuit 72 and linearity compensation circuit 73, and their functions may be realized variously. They are not limited so long as they can be provided on the one-chip IC 60, 160 or 260.

Further, the electrode on the side of the base 11 need not be necessarily divided into three divisions as in the above embodiments. However, division into three divisions as in the above embodiments is desirable. In this case, by making the outermost electrode to be the shield electrode 33 which is grounded or held at a constant voltage, it is possible to preclude the influence of the joining area 20 or the like. Further, as in the circuit 70 in the measure circuit 65 that is included in the one-chip IC 60 in the first embodiment (see FIG. 7), the remaining two electrodes may be used as measure electrodes used for the measurement, thus forming a circuit provision for obtaining an output signal related to the ratio between the sum of and the difference between the electrostatic capacity values CM and CR of the capacitors 35 and 36. By so doing, it is possible to obtain accurate pressure measurement by compensating for the effects of the change in the electric constant of the atmosphere in the space 30 with changes in temperature, relative humidity, etc. Further, in case when more than three division electrodes are provided on the side of the base 11 by providing a grounding electrode or the like separately from the shield electrode 33 between the electrode 31 and reference electrode 32, it is possible to obtain the same effects as in the case of the provision of the three division electrodes.

Figure 16:
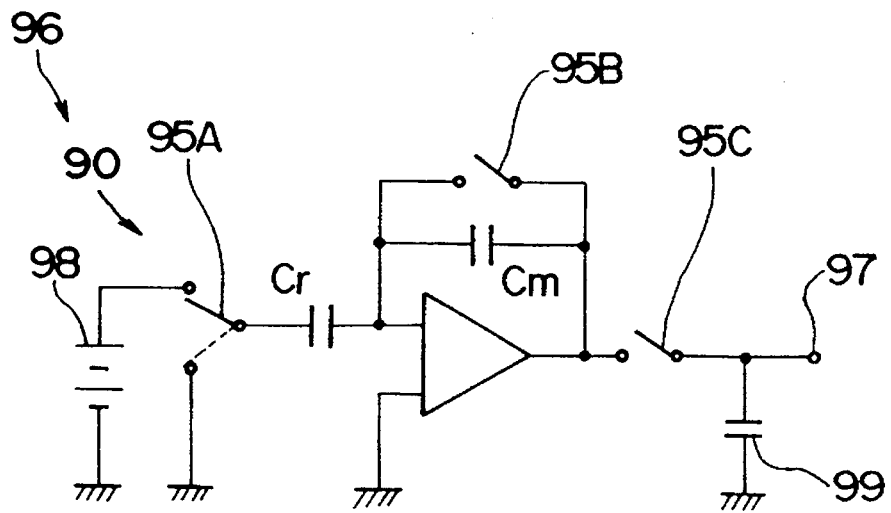
FIG. 16 is a circuit diagram showing a different modification according to the invention.
Figure 17:
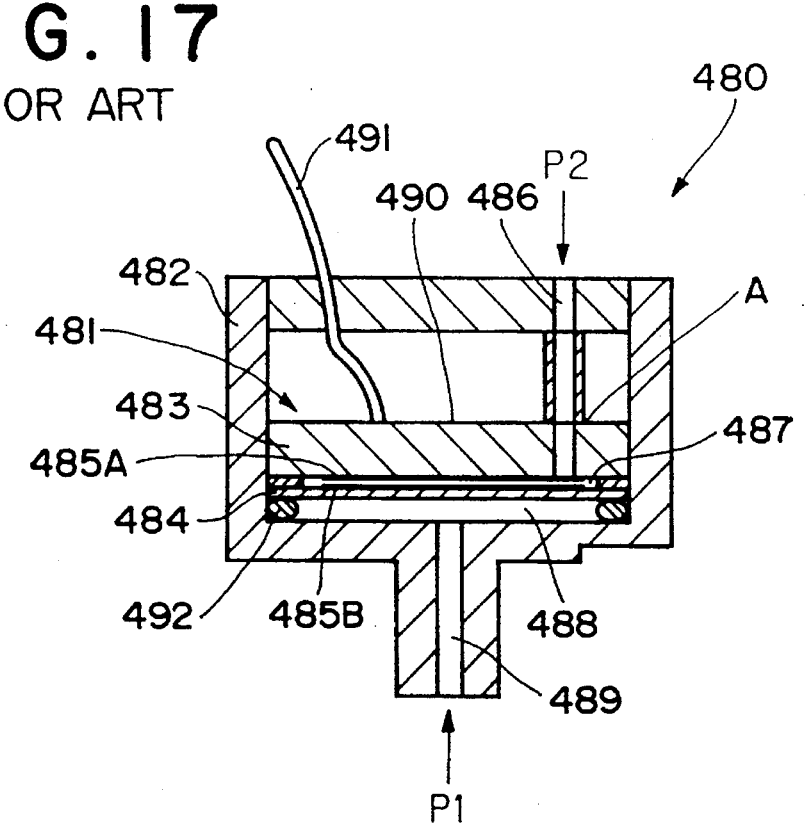
FIG. 17 is a sectional view showing a first prior art pressure sensor.
Figure 18:
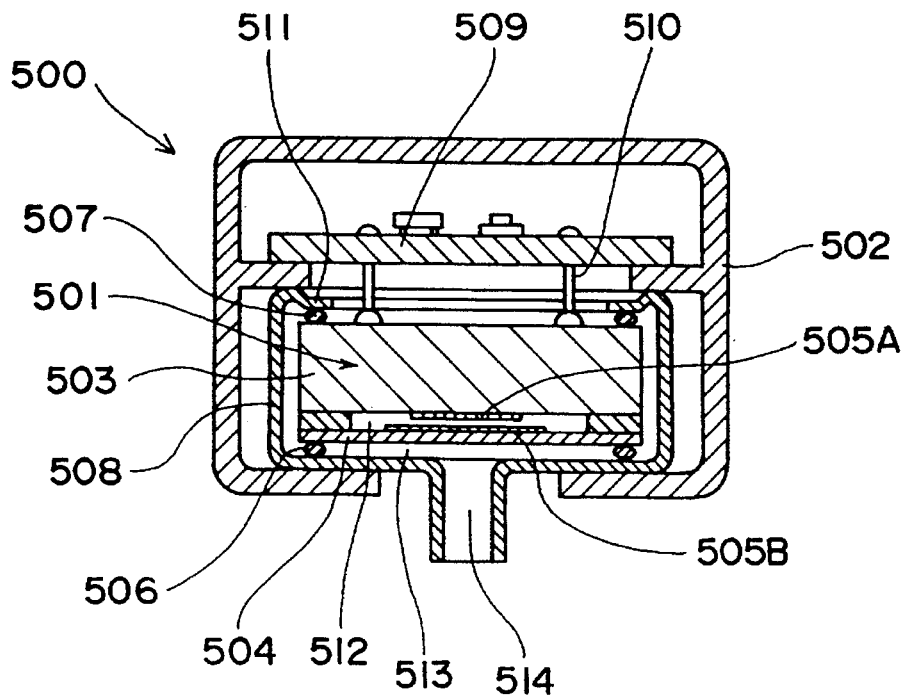
FIG. 18 is a sectional view showing a second prior art pressure sensor.
Figure 19:
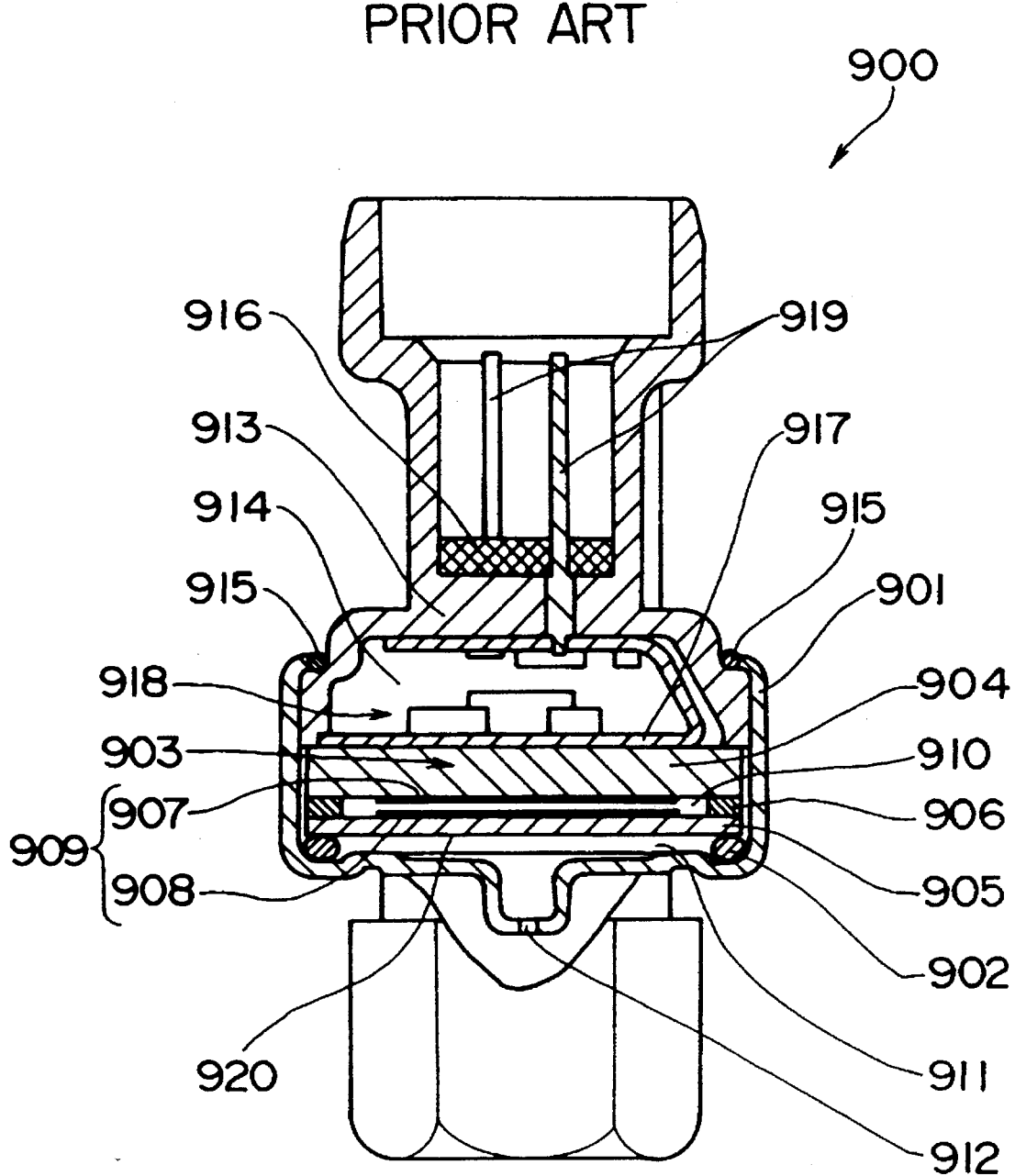
FIG. 19 is a sectional view showing a third prior art pressure sensor.
Figure 20:
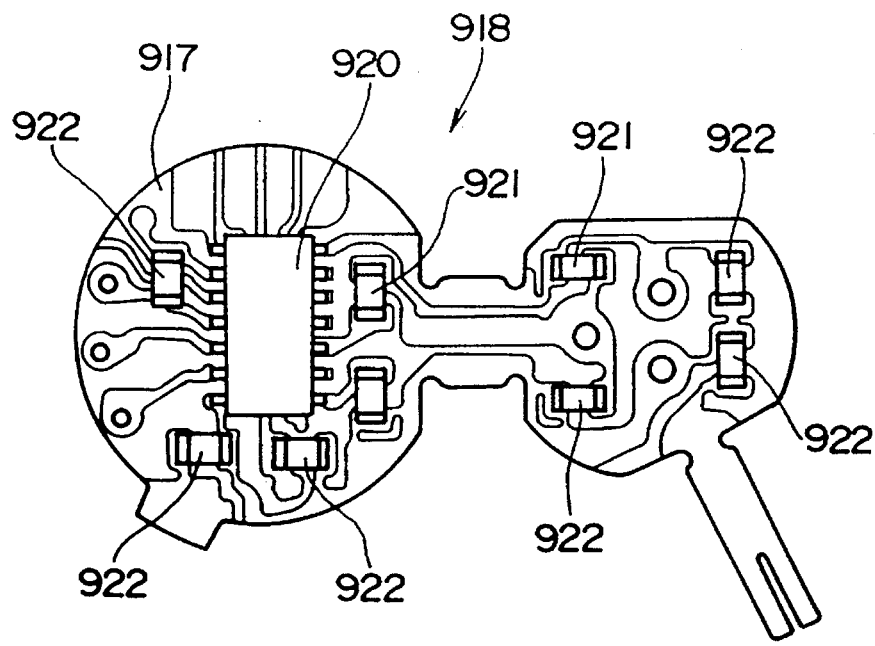
FIG. 20 is is a developed view showing an essential part of the third prior art pressure sensor.
Figure 21:
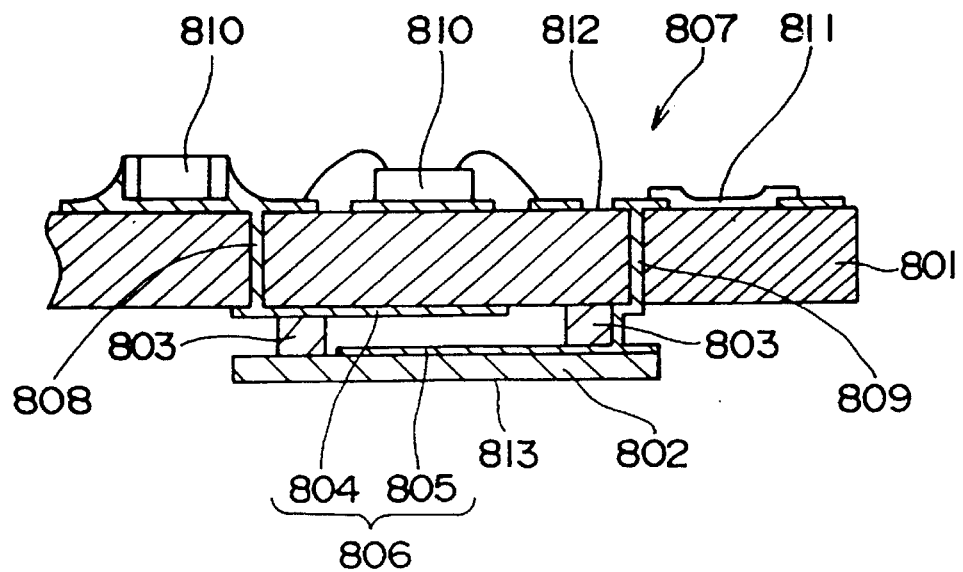
FIG. 21 is a sectional view showing a fourth prior art pressure sensor.

Further, while the circuit provision in the first embodiment has a structure for obtaining the output signal that is related to the ratio (CR−CM)/(CR+CM) between the sum of and the difference between the electrostatic capacity values CM and RM of the capacitors 35 and 36, it is possible to make a structure for obtaining an output signal that is related to the ratio (CR+CM)/(CR−CM), CM/CR, CR/CM, (CR−CM)/CR, (CR−CM)/CM, CR/(CR−CM) or CM/(CR−CM). Again in this case, it is possible to obtain accurate pressure measurement by compensating for the effects of the changes in the dielectric constant of the atmosphere in the space 30. For example, in the circuit provision 90, a measure circuit 96 having switches 95A to 95C as shown in FIG. 16 may be provided in the one-chip IC such that these switches 95A to 95C are switched to obtain at an output terminal 97 an output signal related to the ratio CR/CM between the electrostatic capacity values CM and CM. Where the switch 95A is connected to the side of the power source 98, the switches 95B and 95C are respectively held "on" and "off", and electric charge is stored in each of the capacitors with the electrostatic values CM and CR. Where the switch 95A is connected to the ground side, the switches 95B and 95C are respectively held "on" "off". In this case, necessary electric charge is sample held in the capacitor 99. This measure circuit 96, like the case of the first embodiment, suitably includes zero point adjustment provision, span adjustment provison and linearity compensation provision.

As has been described in the foregoing, according to the invention the input-output policy is provided near the ceramic pressure sensing element based on the electrostatic capacity method for the input and output with respect to the pressure sensing element while preventing external disturbances. It is thus possible to improve the measurement accuracy of the pressure sensor and obtain size reduction thereof.

Specifically, the seal member is provided as a one-piece molding such as to cover the entire periphery of the main body of the pressure sensing element and edge portions of the pressured face and back. Thus, it is possible to obtain reliable seal against the measurement fluid in the pressure chamber, obtain accurate pressure detection, improve durability and facilitate assembling.

Further, the measure circuit for measuring the change in the electrostatic capacity caused with displacement of the elasticity diaphragm is constructed with the sole one-chip IC, which is mounted directly on the measure pattern formed on the back of the main body of the pressure sensing element. It is thus possible to reduce size of the pressure sensor and simplify the process of manufacture.

Further, on the back of the main body of the pressure sensing element, a measure pattern is provided between the electrode terminal for the measure electrode on the base side and the electrode terminal for the electrode on the elasticity diaphragm side such that there is an intervening path which is connected to the electrode terminal or the shield electrode. Thus, it is possible to obtain accurate pressure measurement without being adversely affected by leakage current that may be caused by relative humidity changes. In addition, it is possible to readily manufacture and reduce size of the pressure sensor.

What is claimed is:

1. A pressure sensor for measuring the pressure of a fluid, said pressure sensor comprising:

a main body including a ceramic base formed with a front surface, a back surface opposite said front surface and an outer circumferential surface that extends between said front surface and said back surface, said back surface having a circumferentially extending outer perimeter;

a ceramic, elastic diaphragm coupled to and spaced from said ceramic base front surface so as to define a pressure chamber therebetween, said diaphragm having an inner surface that partially defines said pressure chamber, a pressure face opposite said inner surface that is exposed to the fluid and an outer circumferential surface that extends between said pressure face and said inner surface, said pressure face having a circumferentially extending outer perimeter;

a first electrode disposed on said ceramic base front surface and a second electrode disposed on said diaphragm inner surface;

a signal processing circuit connected to said electrodes and located adjacent to said main body, said signal processing circuit being configured to apply a stimuli signal to said electrodes, to measure a response from said electrodes to said stimuli signal and to generate an output signal based on said measured response that is a function of the pressure of the fluid; and a one-piece seal fitted around said ceramic base outer circumferential surface and said diaphragm outer circumferential surface and positioned to extend over said outer perimeter of said ceramic base back surface and over said outer perimeter of said diaphragm pressure face.

2. The pressure sensor of claim 1, wherein said pressure chamber is sealed from the outside environment.

3. The pressure sensor of claim 2, wherein said pressure chamber is held at a vacuum.

4. The pressure sensor of claim 1, further including a housing enclosing said main body and said diaphragm, said housing being formed with a conduit that extends from an outer surface of said housing to said ceramic base of said main body and wherein said ceramic base is provided with a bore that extends from said housing conduit to said pressure chamber and said seal is positioned to be located between said ceramic base and a portion of said housing defining said conduit wherein said seal is formed with a bore coaxial with said conduit to allow fluid flow therethrough.

5. The pressure sensor of claim 1, further including conductive members that extend from said electrodes through said ceramic base to said ceramic base back surface, each said conductive member terminating at a separate terminal on said ceramic base back surface.

6. The pressure sensor of claim 5, wherein said signal processing circuit is mounted directly on said ceramic base back surface and a conductive pattern is formed directly on said ceramic base back surface, said conductive pattern including at least one conductive trace that extends from one said conductive member terminal to an element of said signal processing circuit.

7. The pressure sensor of claim 6, wherein said signal processing circuit is contained within a single-chip integrated circuit package.

8. The pressure sensor of claim 1, wherein said ceramic base front surface is formed with two spaced apart electrodes so that each said ceramic base electrode forms a separate capacitor with said diaphragm electrode and said signal processing circuit generates said pressure-dependent output signal as a function of the capacitances of said capacitors formed by said electrodes.

9. The pressure sensor of claim 1, wherein said ceramic base front surface is formed with a first inner electrode and an outer shield electrode radially spaced from said inner electrode and said outer shield electrode is connected to said signal processing circuit to provide a ground shield around said inner electrode.

10. A pressure sensor for measuring the pressure of a fluid, said pressure sensor comprising:

a main body including a ceramic base formed with a front surface and a back surface opposite said front surface;

a ceramic, elastically deformable diaphragm coupled to and spaced from said ceramic base front surface so as to define a pressure chamber therebetween, said diaphragm having an inner surface that partially defines said pressure chamber and a pressure face opposite said inner surface that is exposed to the fluid;

a first electrode disposed on said ceramic base front surface and a second electrode disposed on said diaphragm inner surface, said electrodes forming a capacitor with a capacitance that is function of said deformation of said diaphragm;

conductive members that extend through said ceramic base from said electrodes to said ceramic base back surface, each said conductive member terminating at a terminal on said ceramic base back surface;

a single-chip integrated circuit mounted directly on said ceramic base back surface and connected to said electrodes, said integrated circuit being configured to measure the capacitance across said electrodes and to generate an output signal as function of said capacitance measurement that is representative of the pressure of the fluid; and a conductive pattern formed on said ceramic base back surface including at least one conducive trace formed on said back surface for connecting at least one said conductive member terminal to said integrated circuit chip.

11. The pressure sensor of claim 10, wherein:

said ceramic base front surface is provided with a first electrode and a second electrode spaced from said first electrode and said diaphragm electrode functions as a common electrode relative to said ceramic base first and second electrodes so that a first capacitance, CM, develops across said ceramic base first electrode and said diaphragm common electrode and a second capacitance, CR, develops across said ceramic base second electrode and said diaphragm common electrode; and said integrated circuit is configured to place a signal across said ceramic base first electrode and said diaphragm common electrode, to place a signal across said ceramic base second electrode and said diaphragm common electrode and to generate said pressure-dependent output signal as a function of said capacitances CM and CR.

12. The pressure sensor of claim 11, wherein said integrated circuit: produces said pressure-dependent output signal as a function selected from one of the following ratios: (CR−CM)/(CR+CM), (CR+CM)/(CR−CM), CM/CR, CR/CM, (CR−CM)/CR, (CR−CM)/CM, CR/(CR−CM) and CM/(CR−CM); is configured to zero adjust said pressure-dependent output signal; and is configured to produce said pressure-dependent output signal so that said output signal is linearly compensated.

13. The pressure sensor of claim 11, further including a third, shield electrode attached to said ceramic base front surface, said shield electrode configured to be spaced from and surround said first and second ceramic base electrodes, and wherein said shield electrode is connected to said integrated circuit and held at a constant voltage by said integrated circuit.

14. The pressure sensor of claim 10, wherein said pressure chamber is a sealed chamber.

* * * * *

UNITED STATES PATENT AND TRADEMARK OFFICE
CERTIFICATE OF CORRECTION

PATENT NO. : 5 571 970
DATED : November 5, 1996
INVENTOR(S) : Eiji MUTOH et al

It is certified that error appears in the above-indentified patent and that said Letters Patent is hereby corrected as shown below:

Column 29, line 29; change "conducive" to
---conductive---.

Signed and Sealed this

First Day of April, 1997

Attest:

BRUCE LEHMAN

*Attesting Officer*  *Commissioner of Patents and Trademarks*